US012625312B2

(12) United States Patent
Sonnek et al.

(10) Patent No.: US 12,625,312 B2
(45) Date of Patent: May 12, 2026

(54) SHAPED OPTICAL FILM

(71) Applicant: 3M INNOVATIVE PROPERTIES COMPANY, St. Paul, MN (US)

(72) Inventors: Benjamin G. Sonnek, Mahtomedi, MN (US); Daniel J. Richter, Hudson, WI (US); Gregg A. Ambur, San Clemente, CA (US); Chaodi Li, Woodbury, MN (US); Christopher S. DeGraw, Eagan, MN (US); Jathan D. Edwards, Afton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1576 days.

(21) Appl. No.: 17/043,889

(22) PCT Filed: May 15, 2019

(86) PCT No.: PCT/IB2019/054046
§ 371 (c)(1),
(2) Date: Sep. 30, 2020

(87) PCT Pub. No.: WO2019/220377
PCT Pub. Date: Nov. 21, 2019

(65) Prior Publication Data
US 2021/0149099 A1 May 20, 2021

Related U.S. Application Data

(60) Provisional application No. 62/673,296, filed on May 18, 2018.

(51) Int. Cl.
*G02B 5/30* (2006.01)
*B29D 11/00* (2006.01)
(Continued)

(52) U.S. Cl.
CPC ............ *G02B 5/3033* (2013.01); *B29D 11/00* (2013.01); *B32B 1/00* (2013.01); *B32B 3/30* (2013.01);
(Continued)

(58) Field of Classification Search
CPC .. G02B 5/3033; B29D 11/00; B29D 11/0073; B29D 11/00788; B29D 11/00634;
(Continued)

(56) References Cited

U.S. PATENT DOCUMENTS

| | | | |
|---|---|---|---|
| 5,882,774 | A | 3/1999 | Jonza |
| 6,096,375 | A | 8/2000 | Ouderkirk |

(Continued)

FOREIGN PATENT DOCUMENTS

| | | |
|---|---|---|
| CN | 1742390 | 3/2006 |
| CN | 106652803 A | 5/2017 |

(Continued)

OTHER PUBLICATIONS

Delwo R., How Augmented Reality Headsets Work: Driving Into Different Optical Designs, Medium (Year: 2018).*

(Continued)

*Primary Examiner* — Nathan L Van Sell
(74) *Attorney, Agent, or Firm* — Clifton F. Richardson

(57) ABSTRACT

A curved optical film generally lying in a base plane and having a thickness of less than 500 microns, and an average optical absorption of less than 70% for unpolarized normally incident light in a predetermined wavelength range is described. A first cross-section of the optical film in a first plane perpendicular to the base plane has an actual first length AL1, a projected first length PL1, and a first stretch ratio S1 of (AL1–PL1)/PL1. A second cross-section of the optical film in a second plane perpendicular to the first and base planes has an actual second length AL2, a projected (Continued)

second length PL2, and a second stretch ratio S2 of (AL2–PL2)/P2. The optical film may have a maximum thickness variation of less than 20% along each of the first and second cross-sections, S1 may be at least 0.1, and S2 may be at least 0.01 and less than 0.8S1.

20 Claims, 11 Drawing Sheets

(51) Int. Cl.
    *B32B 1/00*            (2024.01)
    *B32B 3/30*            (2006.01)
    *B32B 27/08*         (2006.01)
    *B32B 27/36*         (2006.01)

(52) U.S. Cl.
    CPC ............ *B32B 27/08* (2013.01); *B32B 27/365* (2013.01); *B32B 2307/416* (2013.01); *B32B 2307/42* (2013.01); *B32B 2307/732* (2013.01)

(58) Field of Classification Search
    CPC .. B32B 1/00; B32B 3/30; B32B 27/08; B32B 27/365; B32B 2307/416; B32B 2307/42; B32B 2307/732; B32B 2307/412; B32B 2307/514; B32B 27/308; B32B 27/36; B32B 3/28; B29C 55/16; B29C 53/84; B29C 53/04; B29C 51/14; B29K 2995/0053; B29L 2011/00
    See application file for complete search history.

(56) References Cited

U.S. PATENT DOCUMENTS

| | | | |
|---|---|---|---|
| 6,179,948 | B1 | 1/2001 | Merrill |
| 6,783,349 | B2 | 8/2004 | Neavin |
| 6,788,463 | B2 | 9/2004 | Merrill |
| 6,916,440 | B2 | 7/2005 | Jackson |
| 7,271,951 | B2 | 9/2007 | Weber |
| 7,826,009 | B2 | 11/2010 | Weber |
| 9,162,406 | B2 | 10/2015 | Neavin |
| 9,555,589 | B1 | 1/2017 | Ambur |
| 2001/0028950 | A1 | 10/2001 | Chujo |
| 2011/0205627 | A1 | 8/2011 | Kobuchi et al. |
| 2015/0140279 | A1 | 5/2015 | Kang et al. |
| 2015/0160381 | A1* | 6/2015 | Weber .................. G02B 5/0278 |
| | | | 359/742 |
| 2016/0306086 | A1 | 10/2016 | Haag |
| 2017/0017077 | A1 | 1/2017 | Tang et al. |
| 2019/0018235 | A1 | 1/2019 | Ouderkirk et al. |

FOREIGN PATENT DOCUMENTS

| | | | |
|---|---|---|---|
| JP | | 05188219 | 7/1993 |
| JP | | 2005-250097 | 9/2005 |
| JP | | 2009214486 A | 9/2009 |
| JP | | 2014044244 A | 3/2014 |
| JP | | 2014092580 A | 5/2014 |
| WO | WO 2009-119328 | | 10/2009 |
| WO | | 2017040875 A2 | 3/2017 |

OTHER PUBLICATIONS

Parrish K., Leaap's Motion Prototype Augemented Reality Headse Includes Hand Tracking, Digital Trends (Year: 2018).*
International Search report for PCT International Application No. PCT/IB2019/054046 mailed on Oct. 9, 2019, 6 pages.

* cited by examiner

SHAPED OPTICAL FILM

BACKGROUND

An optical film can be thermoformed into a shaped optical film having a thickness that varies as a result of the thermoforming process.

SUMMARY

In some aspects of the present description, a curved optical film generally lying in a base plane and having an average thickness of less than about 500 microns, and an average optical absorption of less than about 70% for substantially unpolarized substantially normally incident light in a predetermined wavelength range extending at least from 450 nm to 600 nm is provided. A first cross-section of the optical film in a first plane perpendicular to the base plane has an actual first length AL1, a projected first length PL1 on the base plane, and a first stretch ratio S1 defined as (AL1−PL1)/PL1, where S1≥0.1. A second cross-section of the optical film in a second plane perpendicular to the first and base planes has an actual second length AL2, a projected second length PL2 on the base plane, and a second stretch ratio S2 defined as (AL2−PL2)/PL2, where 0.01≤S2<0.8S1. The optical film has a maximum thickness variation of less than about 20% along each of the first and second cross-sections. In some embodiments, 0.02≤S2<0.8S1. In some embodiments, the optical film has a maximum thickness variation of less than about 15% along each of the first and second cross-sections. In some embodiments, the optical film has a maximum thickness variation in a range from about 0.2S1 to about 0.8S1 along each of the first and second cross-sections.

In some aspects of the present description, a curved optical film generally lying in a base plane and having an average thickness of less than about 500 microns, and an average optical absorption of less than about 70% for substantially unpolarized substantially normally incident light in a predetermined wavelength range extending at least from 450 nm to 600 nm is provided. A first cross-section of the optical film in a first plane perpendicular to the base plane has an actual first length AL1, a projected first length PL1 on the base plane, and a first stretch ratio S1 defined as (AL1−PL1)/PL1. A second cross-section of the optical film in a second plane perpendicular to the first and base planes has an actual second length AL2, a projected second length PL2 on the base plane, and a second stretch ratio S2 defined as (AL2−PL2)/PL2, where 0.01<S2<0.7S1. The optical film has a maximum thickness variation in a range from about 0.05S1 to about 0.8S1 along each of the first and second cross-sections. In some embodiments, the optical film has a maximum thickness variation in a range from about 0.2S1 to about 0.8S1 along each of the first and second cross-sections.

In some aspects of the present description, a stretched and shaped optical film stretched and shaped along at least mutually orthogonal directions and having an average optical absorption of less than about 70% for substantially unpolarized substantially normally incident light in a predetermined wavelength range extending at least from 450 nm to 600 nm is provided. When the optical film is placed on a flat surface, a first cross-section of the optical film in a first plane perpendicular to the flat surface has a maximum deviation D1 from a straight line connecting opposing ends of the first cross-section, where the first plane is chosen to maximize D1; and a second cross-section of the optical film in a second plane perpendicular to the first plane and the flat surface has a maximum deviation D2 from a straight line connecting opposing ends of the second cross-section, where the second plane chosen to maximize D2, and where 0.1D1<D2<0.7D1. The optical film has a maximum thickness variation of less than about 15% along each of the first and second cross-sections.

In some aspects of the present description, a stretched and shaped optical film stretched and shaped along orthogonal first and second directions and comprising a plurality of polymeric layers, each layer less than about 500 nm thick is provided. When the optical film is laid on a flat surface, a first cross-section of the optical film in a first plane parallel to the first direction and perpendicular to the flat surface has an actual first length AL1, a projected first length PL1 on the flat surface, and a first stretch ratio S1 defined as (AL1−PL1)/PL1, where S1≥0.15; and a second cross-section of the optical film in a second plane parallel to the second direction and perpendicular to the flat surface has an actual second length AL2, a projected second length PL2 on the flat surface, and a second stretch ratio S2 defined as (AL2−PL2)/PL2, where 0.01≤S2<S1. For substantially normally incident light, each location on the optical film has a corresponding reflection band having a band edge wavelength, the band edge wavelength varying less than 15% along each of the first and second cross-sections.

In some aspects of the present description, a method of forming a stretched and shaped optical film is provided. The method includes providing a flat optical film having an average thickness of less than about 500 microns, and an average optical absorption of less than about 70% for substantially unpolarized substantially normally incident light in a predetermined wavelength range extending at least from 450 nm to 600 nm; bending, but not stretching, the flat optical film to form an unstretched bent optical film comprising an unstretched bent central region having a first shape surrounded by a peripheral region; and stretching the central, but not the peripheral, region of the unstretched bent optical film along at least mutually orthogonal first and second directions resulting in a stretched and shaped optical film.

BRIEF DESCRIPTION OF THE DRAWINGS

FIG. 11 is a schematic top view of an unstretched bent optical film; and

FIG. 12 is a schematic exploded perspective view of an apparatus for forming a stretched and shaped optical film.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments of the present description, it has been found that bending, but not stretching a flat optical film to form an unstretched bent optical film and then stretching a central region of the bent optical film to form a stretched and shaped optical film results in an optical film having improved properties over a comparative optical film formed into the same shape directly from the flat optical film or results in an optical film having a desired shape that cannot be achieved with conventional processes by directly stretching the optical film into the desired shape. For example, in some embodiments, the methods of the present description for forming a stretched and shaped optical film result in an optical film having a reduced thickness variation or band edge wavelength variation compared to that of an optical film formed into the same shape using conventional processes. In some embodiments, the methods of the present description for forming a stretched and shaped optical film result in an optical film having a shape that could not be obtained from with conventional processes by directly stretching the optical film into the shape since the resulting strains from the conventional processes would be greater than a maximum strain at break of the flat optical film.

The optical film may be any suitable type of optical film, such as a reflective polarizer, an absorbing polarizer, a hybrid reflective/absorptive polarizer, a visible light mirror, an infrared mirror, or a diffuser, for example. The optical film may have a thickness less than about 500 microns (e.g., a thickness in a range from about 10 microns to about 500 microns). The optical film may have a relatively low optical absorption for at least one polarization state for at least some wavelengths in a visible wavelength range (e.g., 400 nm to 700 nm). In some embodiments, the optical film has an average optical absorption of less than about 70% for substantially unpolarized substantially normally incident light in a predetermined wavelength range (e.g., extending at least from 450 nm to 600 nm).

Figure 1A:
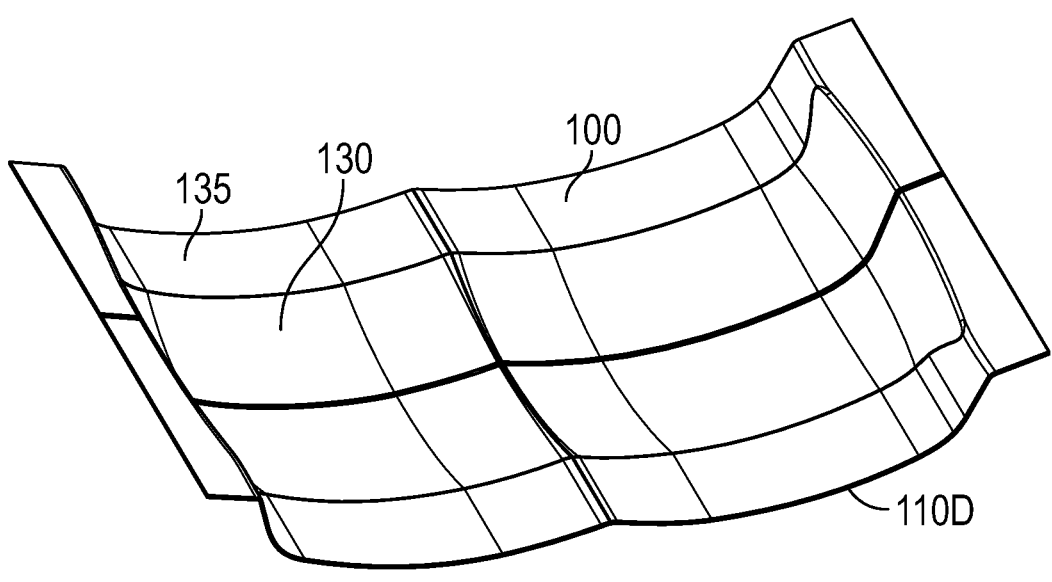
FIG. 1A is a schematic perspective view of an optical film.
Figure 1B:
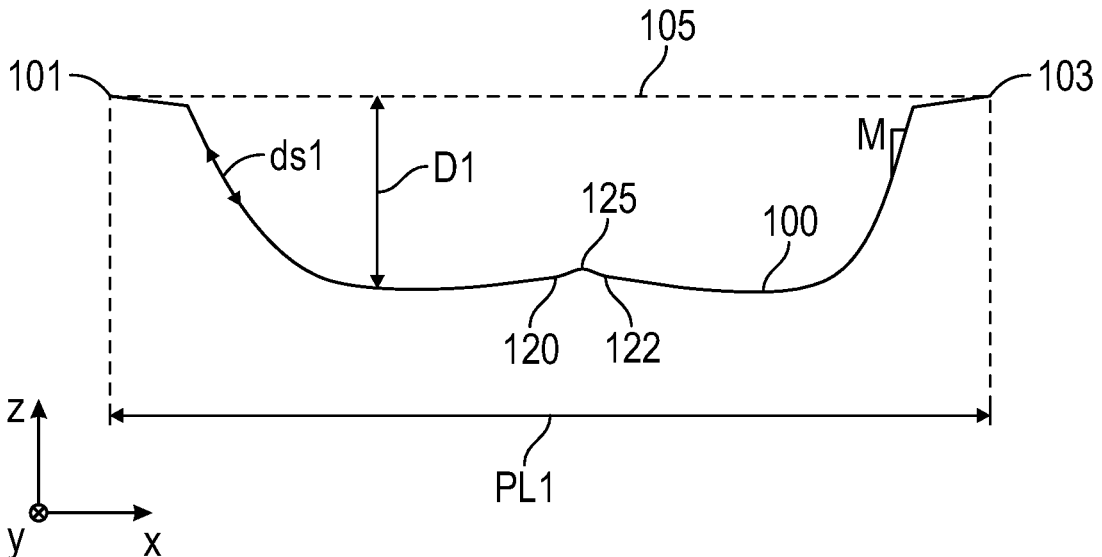
FIG. 1B is a schematic cross-sectional view of the optical film of FIG. 1A in a first plane.
Figure 1C:
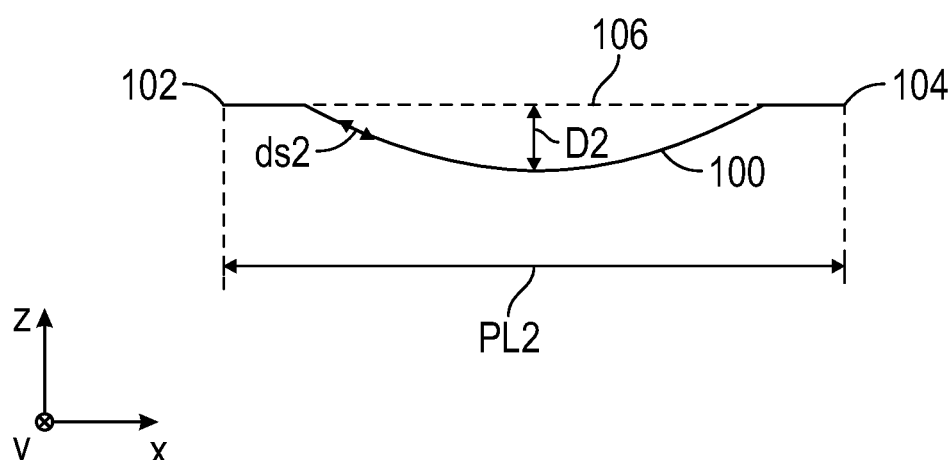
FIG. 1C is a schematic cross-sectional view of the optical film of FIG. 1A in a second plane.

FIG. 1A is a schematic perspective view of a curved optical film 100 generally lying in a base plane (x'-y' plane). In some embodiments, the curved optical film 100 has an average thickness of less than about 500 microns, and an average optical absorption of less than about 70% for substantially unpolarized substantially normally incident light in a predetermined wavelength range extending at least from 450 nm to 600 nm (e.g., from 430 nm to 650 nm). The x'-y'-z' axes of FIG. 1A are centered at a center of the optical film 100. The x-y-z axes parallel to the x'-y'-z' axes of FIG. 1A may also be used. FIG. 1B is a schematic view of a first cross-section of the optical film 100 in a first plane (x-z plane) perpendicular to the base plane. In the first plane, the optical film 100 has an actual first length AL1 and a projected first length PL1 on the base plane. The actual first length AL1 is the arc length ds1 between opposing ends 101 and 103 of the first cross-section and the projected first length PL1 is the length between the opposing ends 101 and 103 of the first cross-section of the optical film 100 as projected onto the base plane. A first stretch ratio S1 may be defined as (AL1−PL1)/PL1. FIG. 1C is a schematic view of a second cross-section of the optical film 100 in a second plane (y-z plane) perpendicular to the first and base planes. In the second plane, the optical film 100 has an actual second length AL2 and a projected second length PL2 on the base plane. The actual second length AL2 is the arc length ds2 between opposing ends 102 and 104 of the second cross-section and the projected second length PL2 is the length between the opposing ends 102 and 104 of the second cross-section of the optical film 100 as projected onto the base plane. A second stretch ratio S2 may be defined as (AL2-PL2)/PL2.

In FIG. 1A, the optical film 100 is laid on a flat surface 110. The flat surface 110 may be, or may be parallel to, the base plane. In some embodiments, when the optical film 100 is placed on a flat surface 110, a first cross-section of the optical film 100 in a first plane (x-z plane, see FIG. 1B) perpendicular to the flat surface 110 has a maximum deviation D1 from a straight line 105 connecting opposing ends 101 and 103 of the first cross-section, where the first plane is chosen to maximize D1. In other words, no cross-section in a plane perpendicular to the flat surface 110 has a larger maximum deviation from a straight line connecting opposing ends of the cross-section, than the first cross-section in the first plane. In some embodiments, when the optical film 100 is placed on a flat surface 110, a second cross-section of the optical film 100 in a second plane (y-z plane, see FIG. 1B) perpendicular to the first plane and the flat surface 110 has a maximum deviation D2 from a straight line 106 connecting opposing ends 102 and 104 of the second cross-section, where the second plane is chosen to maximize D2. In other words, no cross-section in a plane perpendicular to the flat surface 110 and perpendicular to the first plane has a larger maximum deviation from a straight line connecting opposing ends of the cross-section, than the second cross-section in the second plane. The first cross-section of the optical film 100 has a maximum slope M relative to the base plane or flat surface 110. The x-y-z axes of FIGS. 1B and 1C are parallel to the x'-y'-z' axes of FIG. 1A but may be shifted so that the maximum displacements D1 and D2 occur in the x-z and y-z planes, respectively.

The actual first and second lengths AL1 or AL2 can be determined in any suitable way. For example, the deviation from the straight line 105 or 106 can be measured directly with a ruler, for example, to determine the displacement of the film from the straight line as a function of x or y and this can then be used to determine the arc length between measured points which can be summed to give an accurate measurement of the arc length when small spacing between the measured points are used. In some embodiments, a substrate (e.g., a lens) is molded (e.g., injection molded)

onto the optical film and the lengths PL1, PL2, AL1, and AL2, may be determined from measurements on the optical film bonded to the substrate.

Figure 1D:
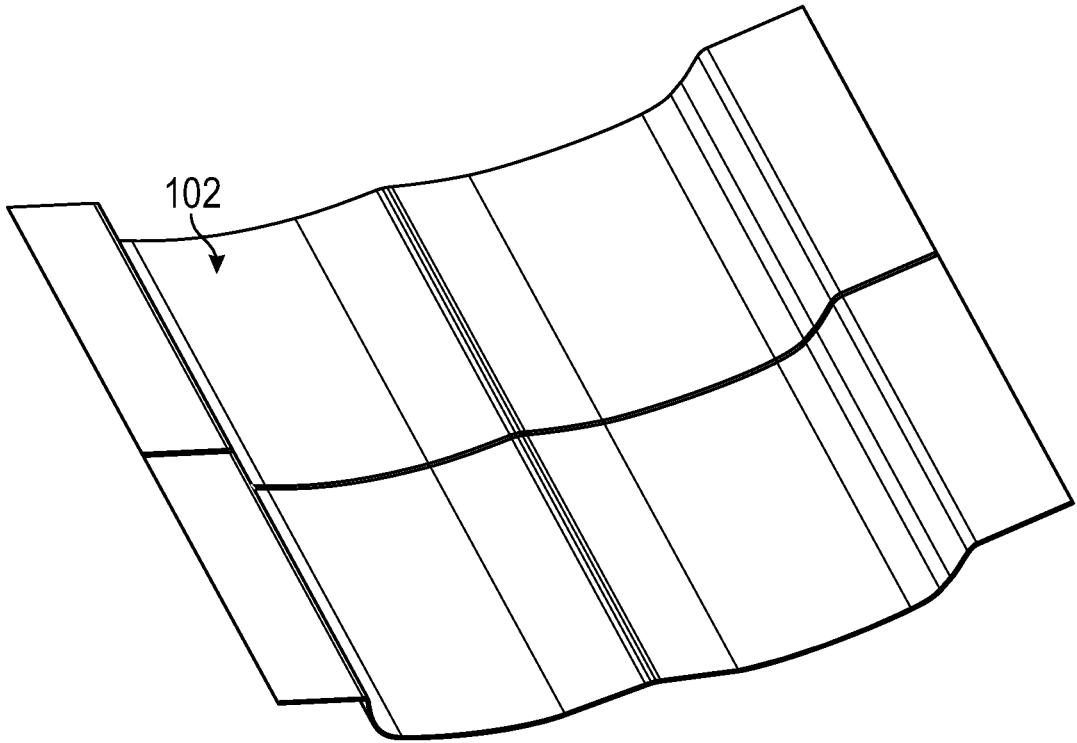
FIG. 1D is a schematic perspective view of a bent optical film which can be stretched and shaped to form the optical film of FIG. 1A.

In some embodiments, optical film 100 is formed by bending, but not stretching a flat optical film to form an unstretched bent optical film and then stretching a central region (e.g., at least a portion of interior region 130) of the bent optical film to form optical film 100 in the desired shape. FIG. 1D is a schematic perspective view of a bent, but unstretched, optical film 102 that can be shaped to form optical film 100. It has been found that bending but not stretching a flat optical film to form an unstretched bent optical film and then stretching a central region of the bent optical film to form an optical film having a desired shape can result in an optical film having a reduced variation in a physical characteristic compared to an optical film stretched into the desired shape directly from a flat optical film. The physical characteristic may be a film thickness, a band edge wavelength, or an optical absorption for a block polarization state, for example. Unstretched in this context means unstretched after the flat optical film has been made. It will be understood that the flat optical film could have been previously stretched (e.g., to orient interference layers) during the process of making the optical film. The geometry of the shaped optical film can be characterized by the stretch ratios S1 and S2 (e.g., in some embodiments, S1≥0.1, 0.01≤S2<0.8S1) and/or by the maximum deviations D1 and D2 (e.g., in some embodiments, 0.1D1<D2<0.7D1). Other useful parameters characterizing the geometry include the maximum slope M (e.g., in some embodiments, M is at least 1.5) and relative values of various length scales (e.g., in some embodiments, 0.4PL1>D1≥0.05PL1). Combinations of these parameters can also be used to characterize the geometry (e.g., in some embodiments, M≥1.5, 0.2*PL1*M≥D1≥0.05*PL1). In some embodiments, the shaped optical film has a smaller variation in a physical characteristic than that of a corresponding shaped optical film shaped using a conventional shaping process and having a same S1 and S2 and/or D1 and D2 and/or M and/or PL1/PL2. In some embodiments, a corresponding shaped optical film having a same S1 and S2 and/or D1 and D2 and/or by M and/or by PL1/PL2 cannot be made using a conventional shaping process since the conventional shaping process results in a strain larger than a strain at failure of the optical film.

In some embodiments, S1≥0.1 or S1≥0.15 or S1≥0.2 (e.g., S1 in a range from 0.1 or 0.15 or 0.2 to 1 or 0.7 or 0.5). In some embodiments, 0.01≤S2<S1, or 0.01≤S2<S1, or 0.01≤S2<0.8S1, or 0.01≤S2<0.7S1, or 0.02≤S2<S1, or 0.02≥S2<0.8S1, or 0.02≤S2<0.7S1. In some embodiments, PL1≥1.5PL2, or PL1≥2PL2, or PL1≥2.5PL2. In some embodiments, 0.5PL1>D1, or 0.4PL1>D1, or 0.3PL1>D1, or 0.25PL1>D1. In some embodiments, D1≥0.05PL1, or D1≥0.1PL1, or D1≥0.15PL1. For example, in some embodiments, 0.4PL1>D1≥0.1PL1. In some embodiments, 0.1D1<D2<0.7D1. In some embodiments, 0.2*PL1*M≥D1≥0.05*PL1, or 0.15*PL1*M≥D1≥0.05*PL1, or 0.1*PL1*M≥D1≥0.05*PL1. In some embodiments, M is at least 1, or at least 1.5, or at least 2, or at least 2.5, or at least 3. In some embodiments, S1≥0.1 and 0.01≤S2<0.8S1; and/or S1≥0.15 and 0.01≤S2<S1; and/or 0.01<S2<0.7S1; and/or 0.1D1<D2<0.7D1. In some such embodiments, the optical film 100 has a maximum thickness variation of less than about 20%, or less than about 15%, along each of the first and second cross-sections (e.g., in a range of about 5% to about 20% or to about 15%); or has a maximum thickness variation in a range from about 0.05S1 to about 0.8S1 (e.g., S1 may be about 0.24 and the maximum thickness variation may be about 0.12 (0.5 times 0.24) or, equivalently, about 12%), or from about 0.05S1 to about 0.9S1, or from about 0.05S1 to about 0.7S1, or from about 0.1S1 to about 0.8S1, or from about 0.2S1 to about 0.8S1, along each of the first and second cross-sections; or has a band edge wavelength varying less than about 20% or less than about 15% along each of the first and second cross-sections (e.g., in a range of about 5% to about 20% or to about 15%). For example, in some embodiments, S1≥0.1 and 0.01≤S2<0.8S1, and the optical film 100 has a maximum thickness variation of less than about 20% along each of the first and second cross-sections. As another example, in some embodiments, 0.01<S2<0.7S1, and the optical film 100 has a maximum thickness variation in a range from about 0.05S1 to about 0.8S1 along each of the first and second cross-sections (e.g., a maximum thickness variation in a range from about 0.2S1 to about 0.8S1 along the first cross-section and a maximum thickness variation in a range from about 0.05S1 to about 0.4S1, or from about 0.05S1 to about 0.5S1, or from about 0.1S1 to about 0.5S1, or from about 0.2S1 to about 0.8S1, along the second cross-section). As another example, in some embodiments, S1≥0.15 and 0.01≤S2<S1, and for substantially normally incident light, each location on the optical film 100 has a corresponding reflection band having a band edge wavelength where the band edge wavelength varies less than about 15% along each of the first and second cross-sections. In some such embodiments, the optical film has a maximum band edge wavelength variation in a range from about 0.2S1 to about 0.8S1 along each of the first and second cross-sections. As still another example, in some embodiments, 0.1D1<D2<0.7D1, and the optical film 100 has a maximum thickness variation of less than about 15% along each of the first and second cross-sections.

Figure 2A:
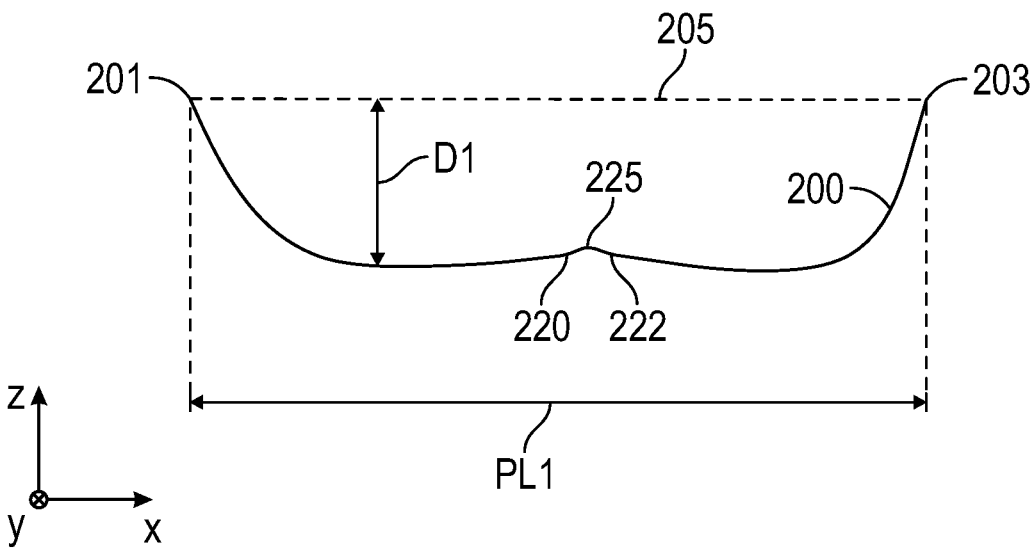
FIGS. 2A-2B are schematic cross-sectional views of an optical film in respective orthogonal first and second planes.
Figure 2B:
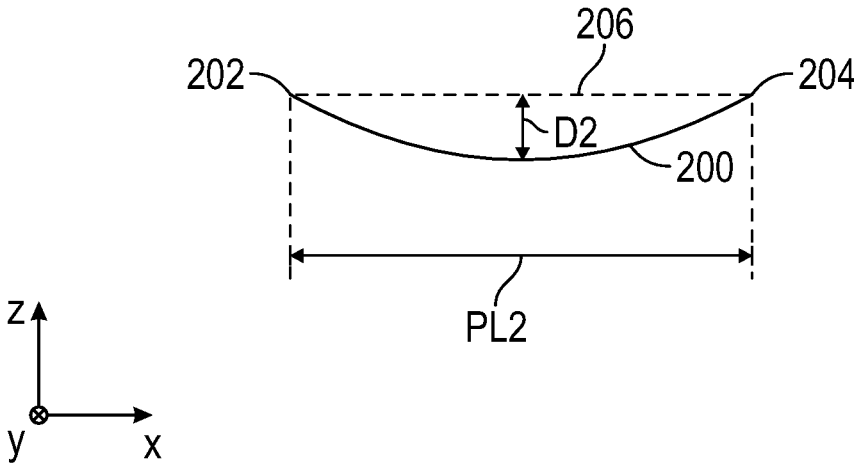

In some embodiments, the optical film 100 includes an interior region 130 surrounded by a peripheral region 135. In some embodiments, the peripheral region 135 is not included in the optical film 100. For example, the peripheral region 135 may be a region included in a forming process, described further elsewhere herein, for making the optical film 100 which is subsequently removed (e.g., via a cutting process such as die cutting) from the optical film. FIGS. 2A-2B are schematic cross-sectional views of an optical film 200 in respective orthogonal first and second planes where a peripheral region corresponding to peripheral region 135 is not included.

Optical film 200 may have any of the geometric (e.g., S1 and S2 and/or D1 and D2 and/or M and/or PL1/PL2 may be in any of the ranges described for optical film 100), thickness and/or band edge wavelength attributes described for optical film 100. For example, in some embodiments, optical film 200 is a curved optical film generally lying in a base plane (x-y plane) and having an average thickness of less than about 500 microns, and an average optical absorption of less than about 70% for substantially unpolarized substantially normally incident light in a predetermined wavelength range extending at least from 450 nm to 600 nm, a first cross-section of the optical film 200 in a first plane (x-z plane see FIG. 2A) perpendicular to the base plane having an actual first length AL1, a projected first length PL1 on the base plane, and a first stretch ratio S1 defined as (AL1–PL1)/PL1, S1≥0.1, a second cross-section of the optical film 200 in a second plane (y-z plane see FIG. 2B) perpendicular to the first and base planes having an actual second length AL2, a projected second length PL2 on the base plane, and a second stretch ratio S2 defined as (AL2–PL2)/PL2, $0.01 \leq S2 < 0.8S1$, the optical film 200 having a maximum thickness variation of less than about 20% along each of the first and second cross-sections. As another example, in some embodiments, optical film 200 is curved optical film generally lying in a base plane (x-y plane) and having an average thickness of less than about 500 microns, and an average optical absorption of less than about 70% for substantially unpolarized substantially normally incident light in a predetermined wavelength range extending at least from 450 nm to 600 nm, a first cross-section of the optical film 200 in a first plane (x-z plane, see FIG. 2A) perpendicular to the base plane having an actual first length AL1, a projected first length PL1 on the base plane, and a first stretch ratio S1 defined as $(AL1 - PL1)/PL1$, a second cross-section of the optical film 200 in a second plane (y-z plane, see FIG. 2B) perpendicular to the first and base planes having an actual second length AL2, a projected second length PL2 on the base plane, and a second stretch ratio S2 defined as $(AL2 - PL2)/PL2$, $0.01 < S2 < 0.7S1$, the optical film 200 having a maximum thickness variation in a range from about 0.05S1 to about 0.8S1, or from about 0.2S1 to about 0.8S1, along each of the first and second cross-sections. As another example, in some embodiments, optical film 200 is a stretched and shaped optical film stretched and shaped along orthogonal first and second directions (x- and y-directions) and including a plurality of polymeric layers, each layer less than about 500 nm thick, such that when the optical film is laid on a flat surface, a first cross-section of the optical film 200 in a first plane (x-z plane, see FIG. 2A) parallel to the first direction (x-direction) and perpendicular to the flat surface has an actual first length AL1, a projected first length PL1 on the flat surface, and a first stretch ratio S1 defined as $(AL1 - PL1)/PL1$, and a second cross-section of the optical film 200 in a second plane (y-z plane, see FIG. 2B) parallel to the second direction (y-direction) and perpendicular to the flat surface has an actual second length AL2, a projected second length PL2 on the flat surface, and a second stretch ratio S2 defined as $(AL2 - PL2)/PL2$, where $S1 \geq 0.15$ and $0.01 \leq S2 < S1$, and for substantially normally incident light, each location on the optical film 200 has a corresponding reflection band having a band edge wavelength, the band edge wavelength varying less than 15% along each of the first and second cross-sections. As another example, in some embodiments, optical film 200 is a stretched and shaped optical film stretched and shaped along at least mutually orthogonal directions (x- and y-directions) and having an average optical absorption of less than about 70% for substantially unpolarized substantially normally incident light in a predetermined wavelength range extending at least from 450 nm to 600 nm, such that when the optical film 200 is placed on a flat surface, a first cross-section of the optical film 200 in a first plane (x-z plane, see FIG. 2A) perpendicular to the flat surface has a maximum deviation D1 from a straight line 205 connecting opposing ends 201 and 203 of the first cross-section, the first plane chosen to maximize D1, a second cross-section of the optical film 200 in a second plane (y-z plane, see FIG. 2B) perpendicular to the first plane and the flat surface has a maximum deviation D2 from a straight line 206 connecting opposing ends 202 and 204 of the second cross-section, the second plane chosen to maximize D2, $0.1D1 < D2 < 0.7D1$, where the optical film 200 has a maximum thickness variation of less than about 15% along each of the first and second cross-sections.

In the embodiment illustrated in FIGS. 1A-1C, optical film 100 includes first and second inflection points 120 and 122 in the first cross-section (see FIG. 1B). The optical film

100 in concave up in a region to the left of the first inflection point 120, concave down between the first and second inflection points 120 and 122, and concave up in a region to the right of the second inflection point. In the illustrated embodiment, the optical film 100 includes one or more saddle points 125. At a saddle point, the optical film 100 is concave down in one cross-section (e.g., the first cross-section of FIG. 1B) and concave up in another cross-section (e.g., the second cross-section of FIG. 1C). In some embodiments, the one or more saddle points are a plurality of saddle points (e.g., a continuum of saddle points along x=0 near y=0). In the first cross-section, a saddle point 125 is disposed between the first and second inflection points 120 and 122. Similarly, in the embodiment illustrated in FIGS. 2A-2B, optical film 200 includes first and second inflection points 220 and 222 in the first cross-section (see FIG. 2A), and includes one or more saddle points 225. In the first cross-section, a saddle point 225 is disposed between the first and second inflection points 220 and 222. In other embodiments, the optical film may be stretched and shaped into a curved optical film not having inflection points in a first cross-section and/or not having one or more saddle points. Optical films having saddle points and/or inflection points and having S1 and S2 and/or D1 and D2 and/or M and/or PL1/PL2 in the ranges described elsewhere herein often cannot be formed using traditional forming methods without causing the optical film to break (e.g., S1 may be greater than a maximum strain at break) or when made using traditional forming methods results in a property (e.g., thickness, band edge wavelength, optical absorption) this has an unacceptably large variation.

The optical film 100 or 200 may have an average optical absorption of less than about 70% for substantially unpolarized substantially normally incident light in a predetermined wavelength range extending at least from 450 nm to 600 nm, or at least from 400 nm to 600 nm, or at least from 450 nm to 650 nm, or at least from 450 nm to 700 nm, or at least from 400 nm to 700 nm. Substantially unpolarized light is light having a sufficiently small degree of polarization that the transmittance, reflectance and absorbance of normally incident substantially unpolarized light differs negligibly from that of normally incident unpolarized light. The degree of polarization is the fraction of light (by intensity) that is polarized. In some embodiments, light described as substantially unpolarized has a degree of polarization of less than 10%. In some embodiments, light described as substantially unpolarized is unpolarized or nominally unpolarized. Substantially normally incident light is light sufficiently close to normally incident that the transmittance, reflectance and absorbance of substantially normally incident unpolarized light differs negligibly from that of normally incident unpolarized light. Substantially normally incident light may, in some embodiments, be within 20 degrees, or within 10 degrees of normally incident, or may be normally incident or nominally normally incident.

In some embodiments, the optical film 100 or 200 is one or more of a multilayer optical film, a reflective polarizer, an absorbing polarizer, a mirror, an infrared mirror, or a substantially transmissive optical film (e.g., a diffuser).

Figure 3A:
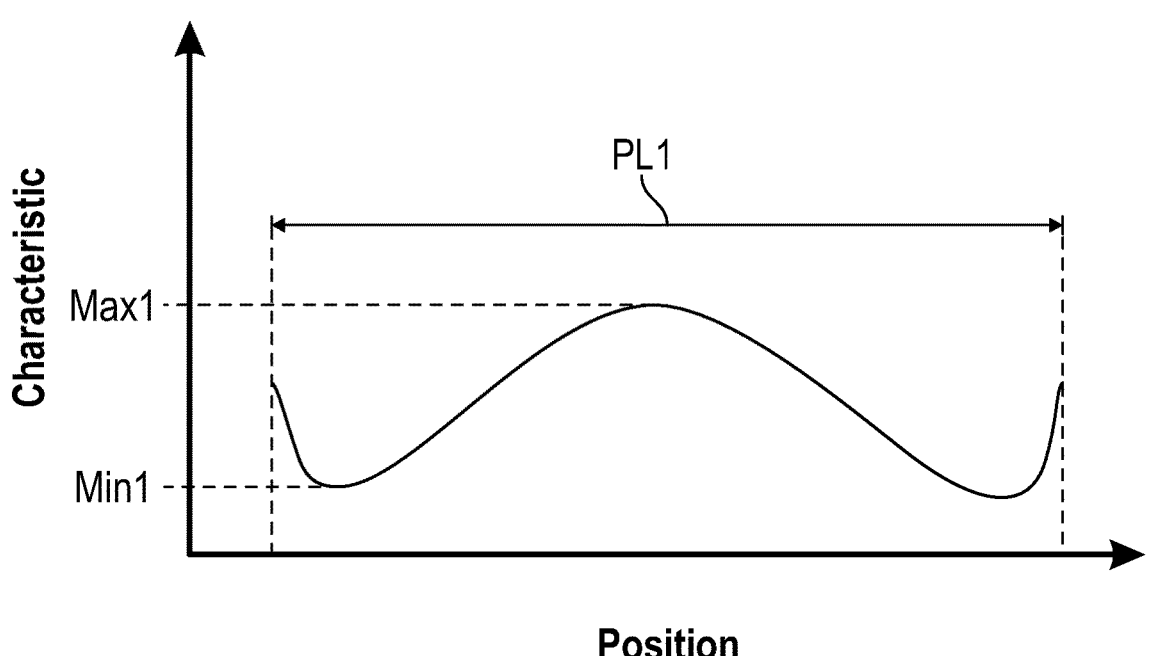
FIGS. 3A-3B are schematic plots of a characteristic of an optical film versus position in first and second cross-sections.
Figure 3B:
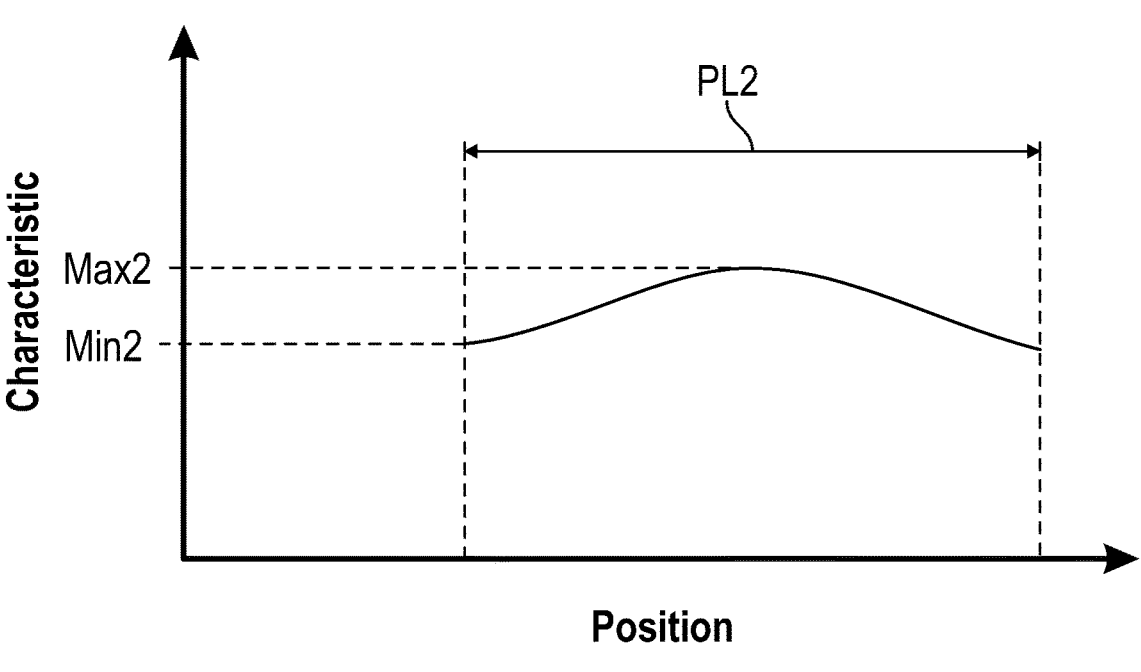

FIG. 3A is a schematic plot of a physical characteristic of an optical film versus position in a first cross-section. FIG. 3B is a schematic plot of the characteristic of the optical film versus position in a second cross-section. The optical film has a projected first length PL1 in the first cross-section and a projected second length PL2 in the second cross-section as described further elsewhere herein. The characteristic may be any property of the optical film which can vary with position. In some embodiments, the characteristic is a thickness of the optical film. In some embodiments, the characteristic is a band edge wavelength of a reflection band of the optical film. In some embodiments, the characteristic is an average absorbance is the predetermined wavelength range of the optical film for substantially normally incident light that is substantially unpolarized, polarized in a block state, or polarized in a pass state. In some embodiments, the optical film includes a plurality of alternating higher and lower index polymeric layers and the band edge wavelength is approximately proportional to the thickness of the plurality of alternating higher and lower index polymeric layers. In some embodiments, the optical film is an absorptive polarizer and a variation in the block state transmission varies (e.g., nonlinearly) with a variation in the thickness of the optical film. The characteristic varies from Min1 to Max1 in the first cross-section and from Min2 to Max2 in the second cross-section. The maximum variation in the characteristic along the first cross-section when expressed as a percent is (Max1−Min1)/Max1 times 100% or, equivalently, when expressed as a fraction is (Max1−Min1)/Max1. The maximum variation in the characteristic along the second cross-section when expressed as a percent is (Max2−Min2)/Max2 times 100% or, equivalently, when expressed as a fraction is (Max2−Min2)/Max2. Whether the maximum variation refers to a percentage variation or a fractional variation will be clear from how the value or range of the maximum variation is specified. For example, a maximum variation of 0.1 refers to a maximum fractional variation of 0.1 (equivalent to a maximum percentage variation of 10%) and a maximum variation of 15% refers to a maximum percentage variation of 15% (equivalent to a maximum fractional variation of 0.15). In some embodiments, the maximum variation in the characteristic (e.g., thickness or band edge wavelength or absorption) is in a range of about 0.05S1 to about 0.9S1, or about 0.05S1 to about 0.8S1, or about 0.05S1 to about 0.7S1, or about 0.1S1 to about 0.8S1, or about 0.2S to about 0.8S1, along each of the first and second cross-sections. In some embodiments, the maximum variation in the characteristic (e.g., thickness or band edge wavelength or absorption) along the first cross-section is in a range of about 0.2S1 to about 0.9S1 or about 0.2S1 to about 0.8S1 or about 0.05S1 to about 0.7S1, and the maximum variation in the characteristic along the second cross-section is in any of these ranges or in a range of about 0.05S1 to about 0.4S1 or about 0.05S1 to about 0.5S1. In some embodiments, the optical film has a maximum thickness variation, and/or a maximum band edge wavelength variation, of less than about 20%, or less than about 15%, along each of the first and second cross-sections.

Figure 4:
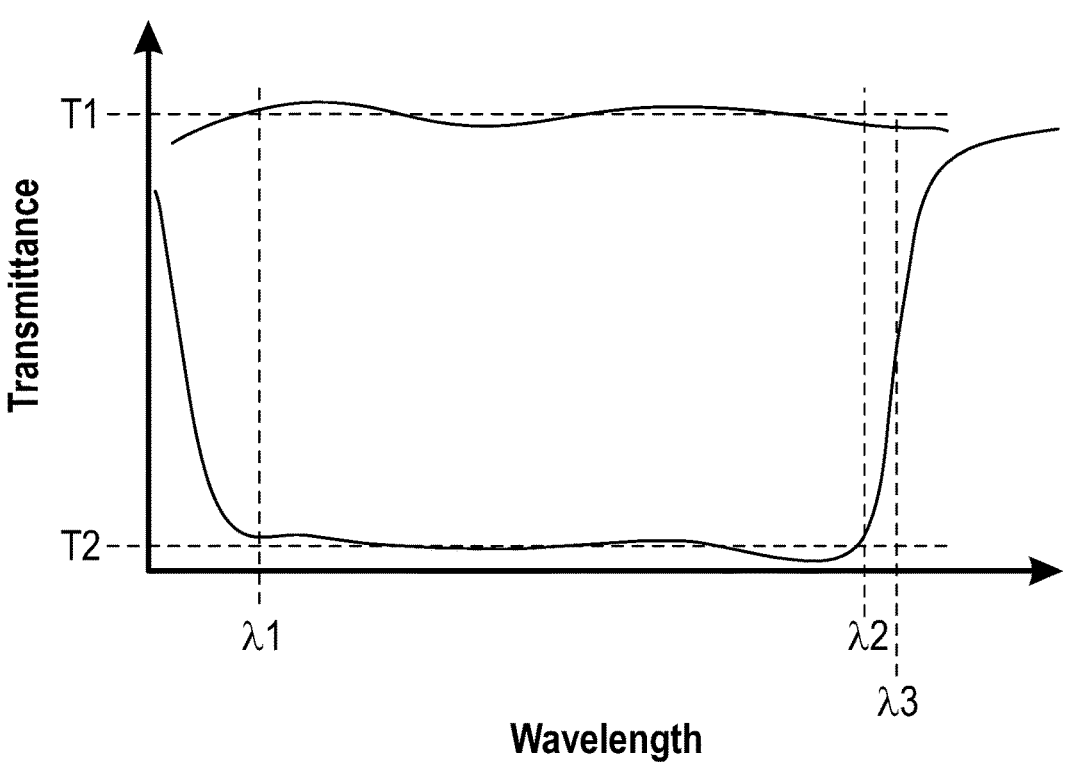
FIG. 4 is a schematic plot of transmittance versus wavelength.

FIG. 4 is a schematic plot of the transmittance of an optical film, or of a plurality of alternating higher index and lower index polymeric layers included in the optical film, for orthogonal first and second polarization states for substantially normally incident light. The average of the transmittance over wavelengths in the predetermined wavelength range from λ1 to λ2 is T1 in the first polarization state and T2 in the second polarization state. In some embodiments, λ1 is in a range from about 400 nm to about 450 nm, and λ2 is in a range from about 600 nm to about 700 nm.

Figure 5:
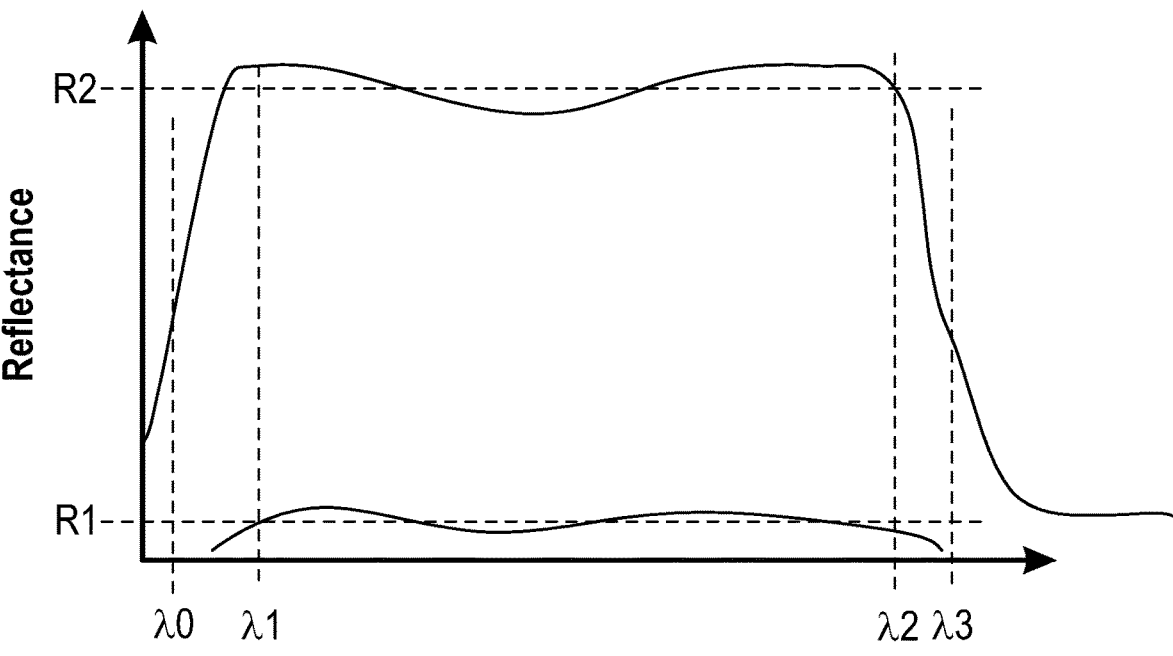
FIG. 5 is a schematic plot of reflectance versus wavelength.

FIG. 5 is a schematic plot of the reflectance of an optical film, or of a plurality of alternating higher index and lower index polymeric layers included in the optical film, for orthogonal first and second polarization states for substantially normally incident light. The average of the reflectance over wavelengths in the predetermined wavelength range from λ1 to λ2 is R1 in the first polarization state and R2 in the second polarization state.

Figure 6:
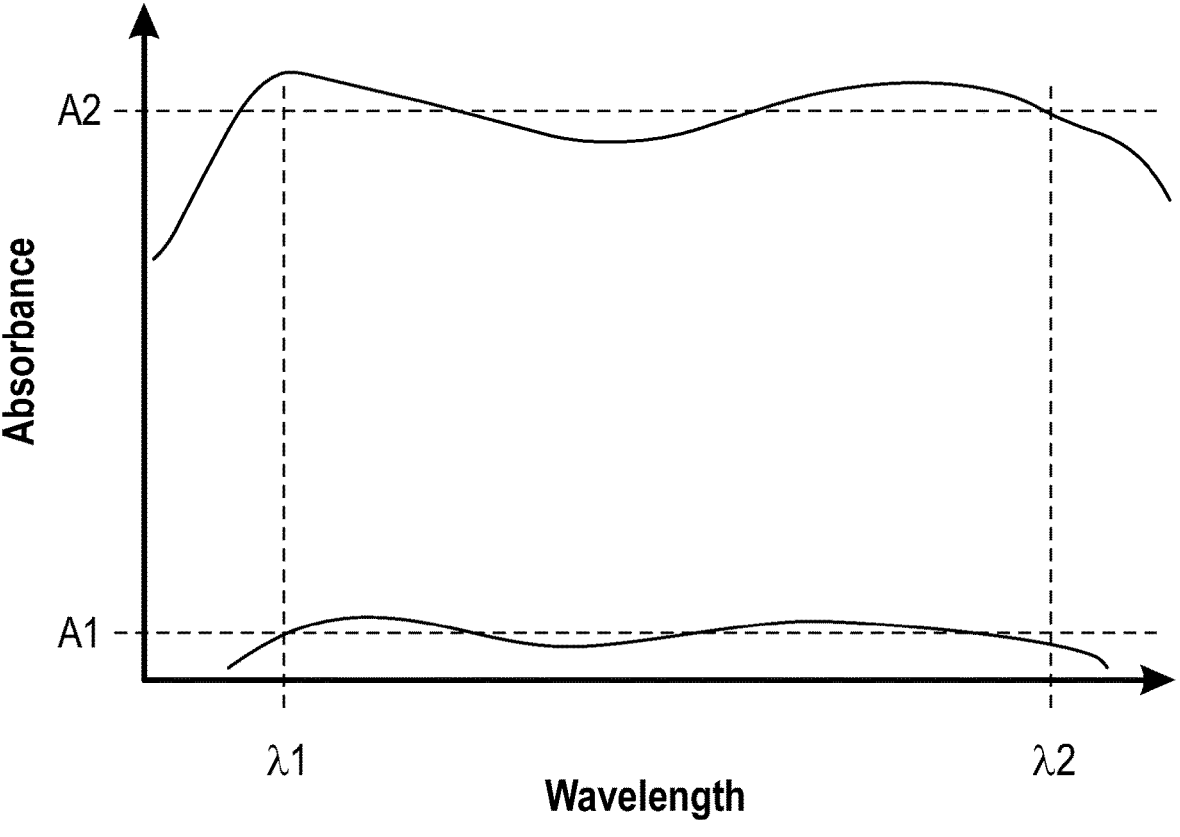
FIG. 6 is a schematic plot of absorbance versus wavelength.

FIG. 6 is a schematic plot of the absorbance of an optical film, or of a plurality of alternating higher index and lower index polymeric layers included in the optical film, for orthogonal first and second polarization states for substantially normally incident light. The average of the absorbance over wavelengths in the predetermined wavelength range from λ1 to λ2 is A1 in the first polarization state and A2 in the second polarization state.

The transmittance, reflectance, and absorbance shown in FIGS. 4-6 may be for a location on a shaped optical film and each location on the film may have a corresponding transmittance, reflectance, and absorbance which may vary from location to location. For example, each location may have a corresponding reflection band generally as illustrated in FIG. 5, but the band edge wavelengths λ0 and/or λ3 may vary with position (e.g., as illustrated in FIGS. 2A-2B). The average transmittance, reflectance, and absorbance refers to the unweighted average over the predetermined wavelength range. An optical film may be said to have an average transmittance, reflectance, and/or absorbance in a specified range if at least one location on the optical film has an average transmittance, reflectance, and/or absorbance in the specified range. In some embodiments, each location in at least a majority of the area of the optical film, or each location in all or substantially all of the area of the optical film may have the specified average transmittance, reflectance, and/or absorbance.

A long wavelength band edge λ3 is illustrated in FIGS. 4-5 and a short wavelength band edge λ0 is indicated in FIG. 5. Reflection bands typically have both long and short wavelength band edges where the reflectance rapidly drops. In the illustrated embodiment, the short wavelength band edge λ0 is less than λ1 and the long wavelength band edge λ3 is greater than λ2. The band edges are determined for substantially normally incident light. The precise wavelength of a band edge can be defined using several different criteria. The wavelength of the band edge may be can be taken to be the wavelength where the reflectance for normally incident light having the second polarization state drops to ½R2 or the wavelength where the transmittance for normally incident light having the second polarization state increases to 10%, for example.

The transmittance of an optical film refers generally to the transmitted light intensity divided by the incident light intensity (for light of a given wavelength, incident direction, etc.), but may be expressed in terms of "external transmittance" or "internal transmittance". The external transmittance of an optical film is the transmittance of the optical film when immersed in air, and without making any corrections for Fresnel reflections at the air/element interface at the front of the element or for Fresnel reflections at the element/air interface at the back of the element. The internal transmittance of an optical film is the transmittance of the film when the Fresnel reflections at its front and back surfaces have been removed. The removal of the front and back Fresnel reflections may be done either computationally (e.g. by subtracting an appropriate function from the external transmission spectrum), or experimentally. For many types of polymer and glass materials, the Fresnel reflections are about 4 to 6% (for normal or near-normal angles of incidence) at each of the two outer surfaces, which results in a downward shift of about 10% for the external transmittance relative to the internal transmittance. If transmittance is referred to herein without being specified as internal or external, it may be assumed that the transmittance refers to external transmittance, unless otherwise indicated by the context.

In some embodiments, an optical film (e.g., optical film 100 or 200) includes a plurality of alternating higher index and lower index polymeric layers, and for substantially normally incident light in the predetermined wavelength range, the plurality of alternating higher index and lower index polymeric layers has an average optical transmittance $T1$ of greater than about 70% for a first polarization state and an average optical reflectance $R2$ of greater than about 70% for an orthogonal second polarization state.

In some embodiments, an optical film (e.g., optical film 100 or 200) includes a plurality of alternating higher index and lower index polymeric layers, and for substantially normally incident light in the predetermined wavelength range, the plurality of alternating higher index and lower index polymeric layers has an average optical reflectance $R1$, $R2$ of greater than about 70% for each of mutually orthogonal first and second polarization states. For example, in the embodiment illustrated in FIG. 5, $R2$ may be 95% or higher and $R1$ may be greater than about 70% but less than $R1$. In other embodiments, $R1$ and $R2$ are about equal. For example, in some embodiments, $R1$ and $R2$ are each greater than about 90%.

In some embodiments, an optical film (e.g., optical film 100 or 200) has an average optical absorption of less than about 70% for substantially unpolarized substantially normally incident light in a predetermined wavelength range extending at least from 450 nm to 600 nm, where for substantially normally incident light in the predetermined wavelength range, the optical film has an average optical transmittance $T1$ of greater than about 70% for a first polarization state and an average optical absorption $A2$ of greater than about 70% for an orthogonal second polarization state. For example, the optical may include dichroic dye(s) in an oriented layer which provides the absorption for the second polarization state. In some embodiments, the optical film is or includes an absorbing polarizer including an iodine stained polyvinyl alcohol layer. In other embodiments, an optical film having an average optical absorption of greater than about 70% for the second polarization state includes a plurality of alternating higher index and lower index polymeric layers. For example, the higher index layers may include one or more dichroic dyes which provides the optical absorption for the second polarization state or a skin layer or skin layers may include one or more dichroic dyes which provides the optical absorption for the second polarization state. In some embodiments, the average optical absorption $A2$ of the optical film for the second polarization state varies less than about 20%, or less than about 15%, or less than about 10% along each of the first and second cross-sections (e.g., the cross-sections of FIGS. 1B-1C or of FIGS. 2A-2B). In some embodiments, for substantially normally incident light in the predetermined wavelength range, the optical film has an average optical transmittance $T2$ for the second polarization state that varies less than about 50%, or less than about 40%, or less than about 30% along each of the first and second cross-sections. In some embodiments, for substantially normally incident light in the predetermined wavelength range having the second polarization state, the optical film has an average optical transmittance $T2$ of less than 1% at each location along each of the first and second cross-sections.

In some embodiments, an optical film (e.g., optical film 100 or 200) has an average optical absorption of less than about 70% for substantially unpolarized substantially normally incident light in a predetermined wavelength range extending at least from 450 nm to 600 nm (e.g., from 400 nm to 700 nm), where for substantially normally incident light in the predetermined wavelength range, the optical film has an average optical transmittance of greater than about 50%, or greater than about 60%, or greater than about 70%, for each of orthogonal first and second polarization states. For example, in some embodiments, the optical film may be a substantially transparent film having a desired optical clarity or optical haze, for example. In some embodiments, the optical film has an average optical transmittance of greater than about 50%, or greater than about 60%, or greater than about 70%, for each of orthogonal first and second polarization states in the predetermined wavelength range extending at least from 450 nm to 600 nm, and has an average optical reflectance of greater than about 50%, or greater than about 60%, or greater than about 70%, for each of orthogonal first and second polarization states in a different second predetermined wavelength range not overlapping with the predetermined wavelength range extending at least from 450 nm to 600 nm. For example, the optical film may be substantially transparent in the wavelength range from 450 nm to 600 nm, but may be reflective in a near infrared wavelength range. Near infrared wavelengths generally include wavelengths from about 700 nm to about 2500 nm. In some embodiments, a predetermined infrared wavelength range extends at least from 850 nm to 900 nm (e.g., from 800 nm to 950 nm), or at least from 800 nm to 1000 nm, or at least from 793 nm to 1064 nm, for example. A predetermined infrared wavelength range useful for laser protective eyewear may extend at least from 793 nm to 1064 nm, for example, since some types of laser diodes produce a wavelength of about 793 nm and a neodymium-doped yttrium aluminum garnet (Nd:YAG) laser produces a wavelength of about 1064 nm. In some embodiments, an optical film (e.g., optical film 100 or 200) includes a plurality of alternating higher index and lower index polymeric layers, and for substantially normally incident light in the predetermined wavelength range, the optical film has an average optical transmittance of greater than about 50% for each of orthogonal first and second polarization states, and where for substantially normally incident light in a predetermined infrared wavelength range not overlapping with the predetermined wavelength range, the plurality of alternating higher index and lower index polymeric layers has an average optical reflectance of greater than about 70% for each of the first and second polarization states.

Figure 7A:
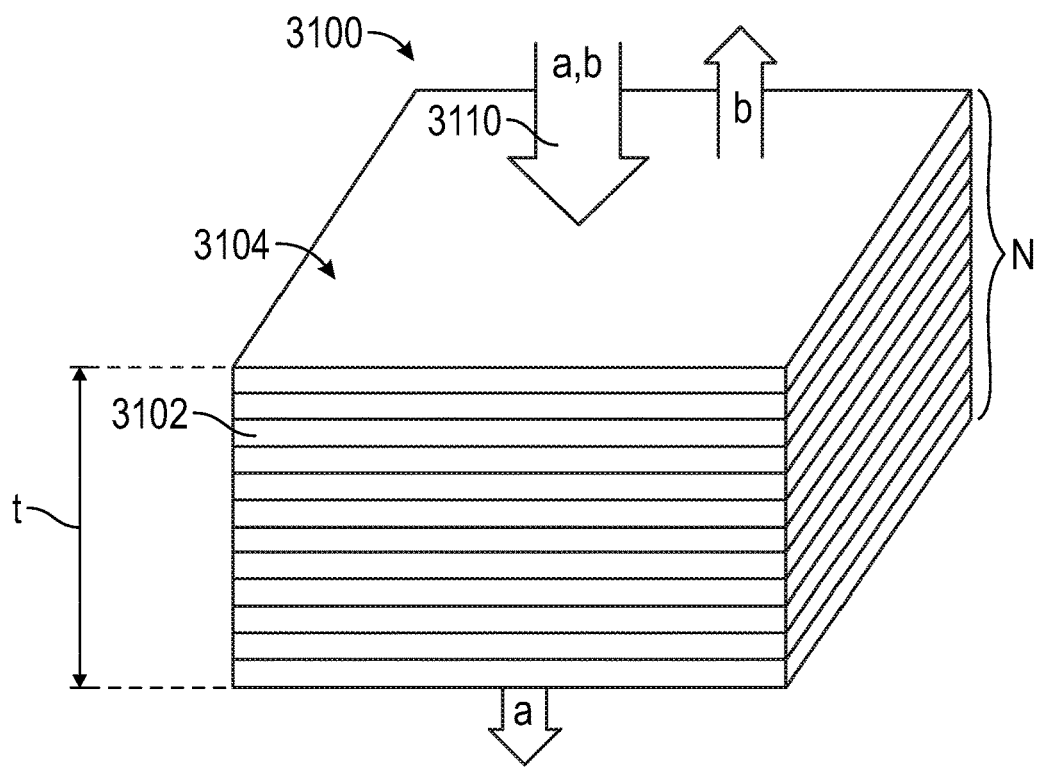
FIG. 7A is a schematic perspective view of an optical film.
Figure 7B:
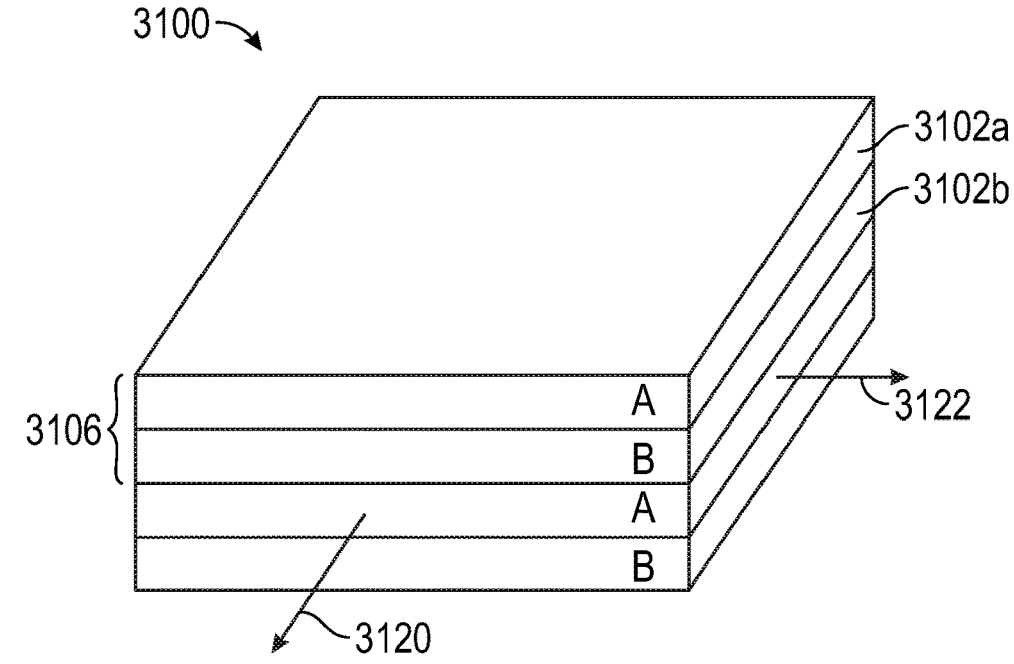
FIG. 7B is a schematic perspective view of a segment of the optical film of FIG. 7A.

In some embodiments, an optical film (e.g., optical film 100 or 200) includes a plurality of alternating higher index and lower index polymeric layers. FIG. 7A is a schematic perspective view of an optical film 3100 which may correspond to optical film 100 or 200 prior to shaping the optical film 100 or 200, or may correspond to a portion of optical film 100 or 200 where the curvature of the optical film is not visible in FIG. 7A. FIG. 7B is a schematic perspective view of a segment of the optical film 3100. Optical film 3100 includes a plurality of polymeric interference layers 3102 having a total of (N) interference layers 3102. FIG. 7B is a schematic perspective diagram of a segment of the optical film 3100 illustrating alternating higher index (A-layers) and lower index (B-layers) polymeric layers 3102a and 3102b. Optical film 3100 has an average thickness t of less than about 500 microns. The average thickness refers to the thickness average over the area of the optical film. In some embodiments, prior to stretching and shaping the optical film, the thickness is substantially uniform so that the thickness of the optical film is substantially equal to the average thickness t.

During use, light incident on a major surface of optical film 3100 (e.g., film surface 3104), depicted by incident light 3110 may enter a first layer of optical film 3100 and propagate through the plurality of interference layers 3102, undergoing select reflection or transmission by optical interference depending on the polarization state of incident light 3110. Incident light 3110 may include a first polarization state (a) and a second polarization state (b) that are be mutually orthogonal to one another. In some embodiments, the optical film 3100 is a polarizer and the first polarization state (a) may be considered as the "pass" state while the second polarization state (b) may be considered as the "block" state. In some embodiments, optical film 3100 is a polarizer oriented along a stretch axis 3120 and not oriented along an orthogonal axis 3122. In such embodiments, the polarization state of normally incident light having an electric field along the axis 3122 is the first polarization state (a) and the polarization state of normally incident light having an electric field along the axis 3120 is the second polarization state (b).

In some embodiments, as incident light 3110 propagates through plurality of interference layers 3102, portions of the light in the second polarization state (b) is reflected by adjacent interference layers resulting in the second polarization state (b) being reflected by optical film 3100, while a portion of the light in the first polarization state (a) collectively passes through optical film 3100.

In some embodiments, the higher index layers 3102a include one or more dichroic dyes which absorb some or substantially all of the light in the second polarization state (b) that would have otherwise been reflected by optical film 3100. Suitable dichroic dyes include those available from Mitsui Fine Chemical, Japan, for example. Reflective polarizers including dichroic dye(s) in the higher index layers are described in U.S. Pat. Appl. Publ. No. 2016/0306086 (Haag et al.), for example. In some embodiments, a multilayer optical film includes dichroic dye(s) in skin layer(s) as described in U.S. Pat. No. 6,096,375 (Ouderkirk et al.), for example. In some embodiments, a shaped optical film includes an absorbing element having a first major surface and a second major surface, a first reflective polarizer disposed on the first major surface of the absorbing element, and a second reflective polarizer disposed on the second major surface of the absorbing element as described in U.S. Pat. No. 7,826,009 (Weber et al.), for example. Each of the first and second reflective polarizers may correspond to optical film 3100, for example.

Interference layers may be described as reflecting and transmitting light primarily by optical interference when the reflectance and transmittance of the interference layers can be reasonably described by optical interference or reasonably accurately modeled as resulting from optical interference. Adjacent pairs of interference layers having different refractive indices reflect light by optical interference when the pair has a combined optical thickness (refractive index along the block axis times physical thickness) of ½ the wavelength of the light. Interference layers typically have a physical thickness of less than about 500 nm or less than about 200 nanometers. In some embodiments, each polymeric interference layer has an average thickness (unweighted average of the physical thickness over the layer) in a range of about 45 nanometers to about 200 nanometers. Noninterference layers have an optical thickness too large to contribute to the reflection of visible light via interference.

Noninterference layers typically have a physical thickness of at least 1 micrometer, or at least 5 micrometers. The interference layers 3102 may be a plurality of polymeric interference layers reflecting and transmitting light primarily by optical interference in the predetermined wavelength range. The average thickness of the optical film including the interference layers and the noninterference layers may be less than about 500 microns.

Methods of making optical films including alternating polymeric interference layers are known in the art and are described in U.S. Pat. No. 5,882,774 (Jonza et al.), U.S. Pat. No. 6,179,948 (Merrill et al.), U.S. Pat. No. 6,783,349 (Neavin et al.), and U.S. Pat. No. 9,162,406 (Neavin et al.), for example.

Figure 8A:
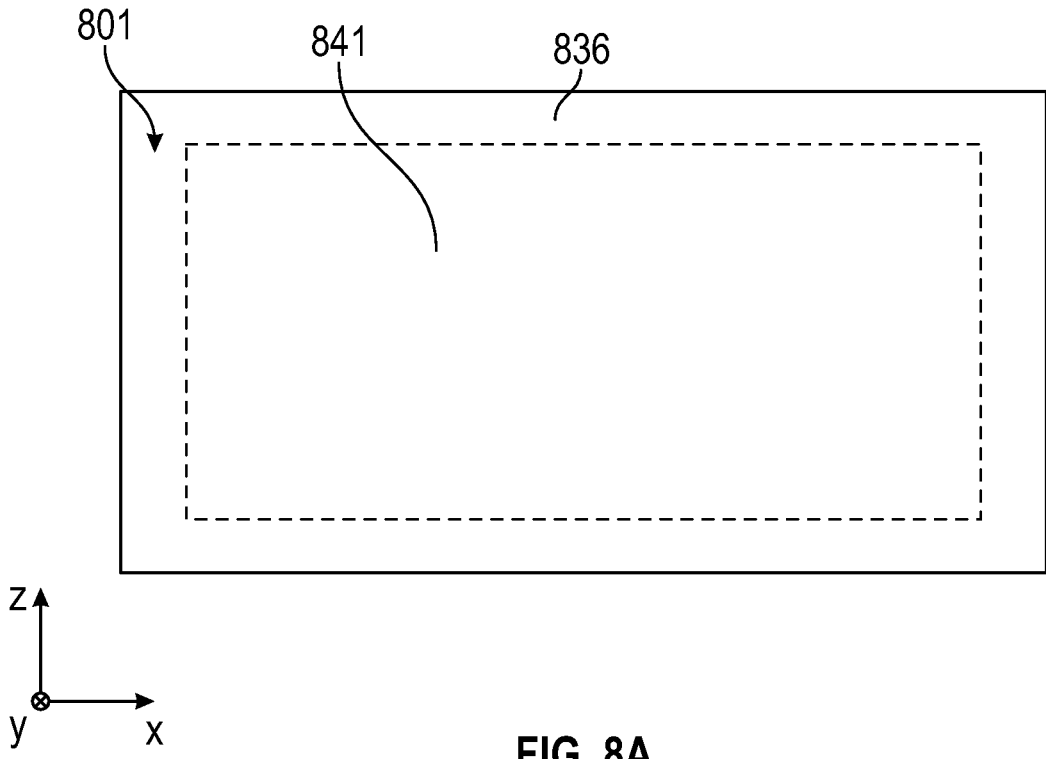
FIG. 8A is a schematic top view of a flat optical film.
Figure 8B:
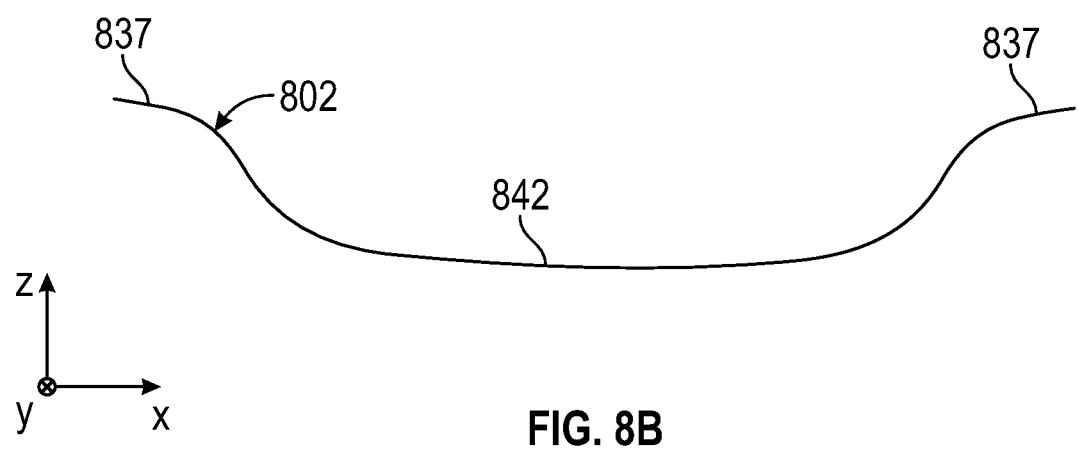
FIG. 8B is a schematic cross-sectional view of an unstretched bent optical film.
Figure 8C:
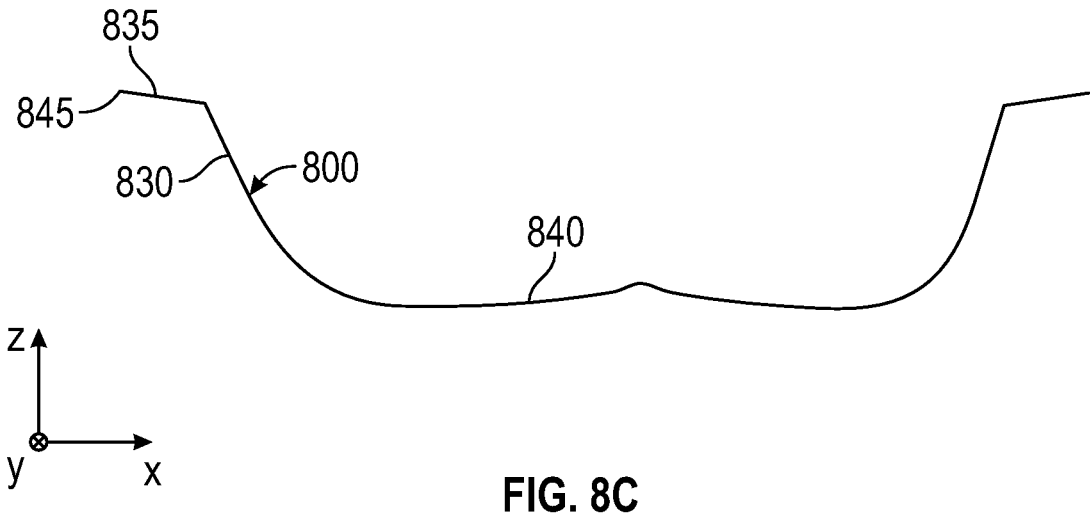
FIG. 8C is a schematic cross-sectional view of a shaped optical film.

FIGS. 8A-8C schematically illustrate steps in a method of forming a stretched and shaped optical film 800 starting from a flat optical film 801 which includes a flat central region 841 and a flat peripheral region 836. In some embodiments, a method of forming a stretched and shaped optical film 800, includes the steps of: providing a flat optical film 801; bending, but not stretching, the flat optical film 801 to form an unstretched bent optical film 802 including an unstretched bent central region 842 (e.g., corresponding to flat central region 841 or a portion of flat central region 841) having a first shape surrounded by a peripheral region 837 (e.g., corresponding to flat peripheral region 836); stretching the central, but not the peripheral, region of the unstretched bent optical film 802 along at least mutually orthogonal first and second directions (x- and y-directions) resulting in a stretched and shaped optical film 800. FIG. 8A is a schematic top view of the flat optical film 801; FIG. 8B is a schematic cross-sectional view of the unstretched bent optical film 802; and FIG. 8C is a schematic cross-sectional view of the shaped optical film 800. The shaped optical film 800 may correspond to optical film 100 and may have the shape depicted in FIGS. 1A-1C, for example. The unstretched bent optical film 802 may have the shape schematically depicted in FIG. 8B along each cross-section parallel to the x-z plane. In some embodiments, the step of bending, but not stretching, the flat optical film 801 includes bending the flat optical film 801 about the second, but not the first, direction. For example, the unstretched bent optical film 802 may be bent about the y-direction, but not about the x-direction.

In some embodiments, the step of stretching the central, but not the peripheral, region of the unstretched bent optical film along the at least mutually orthogonal first and second directions includes clamping the unstretched bent optical film 802 along at least portions of the peripheral region 837 and then stretching the central region 842 so that it conforms to a curved mold surface. The clamped region may be curved about the y-direction, but not about the x-direction. For example, first and second fixtures including respective first and second portions adapted to clamp the optical film between the first and second portions may be utilized where the shapes of the first and second portions are selected to conform to the peripheral region of the stretched and shaped optical film in the clamped region. In some embodiments, stretching the central region 842 is carried out by pressing the curved mold surface into the optical film causing the film to stretch as it conforms to the shape of the curved mold surface. Such forming processes can be implemented utilizing a vacuum forming machine from MAAC Machinery Corporation (Carol Stream, IL), for example. In some embodiments, stretching the central region 842 is carried out by applying pressure (e.g., air pressure) to the optical film causing the optical film to stretch until it contacts the curved mold surface (see, e.g., FIG. 12). Such pressurization processes can be carried out utilizing a forming machine from Hy-Tech Forming Systems (USA), Inc. (Phoenix, AZ), for example.

Figures 11, 12:
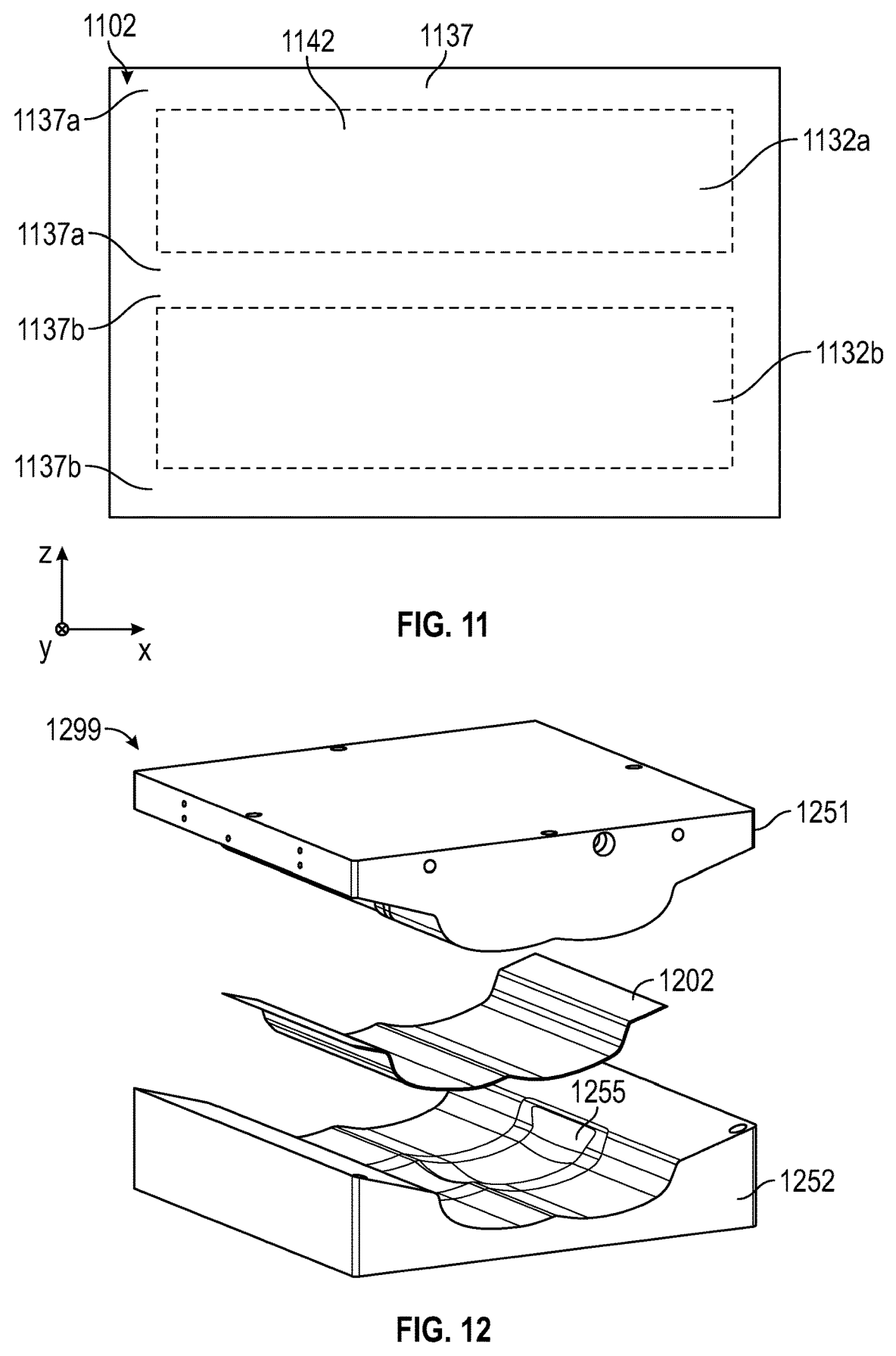

FIG. 12 is a schematic exploded perspective view of an apparatus 1299 for forming a stretched and shaped optical film. The apparatus includes upper and lower platens 1251 and 1252. Lower platen incudes a mold insert 1255 having surface having a desired shape of the stretched and shaped optical film. An unstretched bent optical film 1202 is illustrated between the upper and lower platens 1251 and 1252. In some embodiments, a method of forming a stretched and shaped optical film utilizes apparatus 1299 as follows. First a flat optical film is placed on the upper surface of the lower platen 1252. The flat optical film can be allowed to relax without pushing the film into the shape of the upper surface of the lower platen 1252. Next, the upper platen 1251 is moved downward towards the lower platen 1252 until a peripheral region of the upper and lower platens 1251 and 1252 contact the optical film in the peripheral region surrounding the mold insert 1255 clamping a peripheral region of the optical film. Before the upper and lower platens 1251 and 1252 clamp the optical film, the optical film can slide relative to the upper and lower platens 1251 and 1252. The result is that the optical film is bent without stretching to conform to the peripheral portions of the upper and lower platens 1251 and 1252 so that it has the shape of the unstretched bent optical film 1202 illustrated in FIG. 12. In some embodiments, the upper platen 1251 has a recessed area so that the upper platen 1251 does not contact an interior portion of the unstretched bent optical film 1202 when the upper and lower platens 1251 and 1252 initially clamp the optical film 1202. In some embodiments, the upper platen is heated. In some embodiments, the mold insert 1255 is porous (e.g., porous aluminum). In some embodiments, air pressure is applied through the mold insert (e.g., through the porous aluminum) to press the optical film 1202 against the upper platen 1251 in order to heat the optical film 1202. Then the air pressure is released and air pressure is applied above the optical film to press the optical film into contact with the curved mold surface of the mold insert 1255 which may be at a lower temperature and so may cool the optical film. This pressurization step stretches and shapes the optical film into the shape of the curved mold surface of the mold insert 1255. In other embodiments, the upper platen 1251 is replaced with a compression forming mold which can mechanically push the optical film toward the lower platen 1252.

In some embodiments, the step of stretching the central, but not the peripheral, region of the unstretched bent optical film 802 along the at least mutually orthogonal first and second directions includes stretching the unstretched bent optical film 802 more along the first direction (x-direction) and less along the second direction (y-direction). In some embodiments, the step of stretching the central, but not the peripheral, region of the unstretched bent optical film 802 along the at least mutually orthogonal first and second directions includes stretching the unstretched bent optical film substantially equally along the first and second directions. In this context, substantially equal stretching along the first and second directions can be understood to mean stretched to a strain in the first direction within 10% of a strain in the second direction.

The optical film 800 has a central region 840 corresponding to the unstretched bent central region 842. The peripheral region 835 may correspond to portions of the optical film 800 proximate the periphery of the optical film that can be removed before use, and the central region 840 may correspond to the remaining portion of the optical film 800. For example, central region 840 may correspond to optical film 200. The interior portion 830 may be or include portions of the optical film not clamped during the forming process. The peripheral region 835 may include a portion of the interior portion 830. In some embodiments, the central region 840 is completely surrounded by the peripheral region 835. In other embodiments, some portion(s) of the peripheral region is absent so that the central region 840 may not be completely surrounded by the peripheral region 835. For example, the central region 840 may be surrounded by the peripheral region 835 on each of four sides of the optical film 800 but not in the corners. In some embodiments, the optical film 800 includes an interior portion 830 surrounded by an edge perimeter 845, where the central region 840 is a portion of the interior portion 830 and the peripheral region 835 includes at least a portion of the edge perimeter 845. In some embodiments, the optical film 800 includes an interior portion 830 surrounded by an edge perimeter 845, where the central region 840 is a portion of the interior portion 830 and at least a portion of the peripheral region 835 is a portion of the interior portion 830 and away from the edge perimeter 845.

In some embodiments, the flat optical film 801 has an average thickness of less than about 500 microns. The flat optical film 801 may have any of the optical properties described elsewhere herein for curved optical films. For example, the flat optical film 801 may have an average optical absorption of less than about 70% for substantially unpolarized substantially normally incident light in a predetermined wavelength range extending at least from 450 nm to 600 nm. The predetermined wavelength range may be any of the ranges described further elsewhere herein and may extend at least from 400 nm to 600 nm, or at least from 450 nm to 650 nm, or at least from 450 nm to 700 nm, or at least from 400 nm to 700 nm, for example.

Figure 8D:
FIG. 8D is a schematic cross-sectional view of a flat optical film including liners.

In some embodiments, the flat optical film 801 includes one or more liners, the method further includes the step of removing the one or more liners after stretching the central, but not the peripheral, region of the unstretched bent optical film 802 to provide the stretched and shaped optical film 800. For example, FIG. 8D is a schematic cross-sectional view of a flat optical film 1801 including liners 847 and 849 on opposing major surfaces of optical film 2801. In some embodiments, the optical film 1801 is stretched and shaped into to a desired shape and then liners 847 and 849 are removed leaving the optical film 2801 formed into the desired shape.

Figure 9:
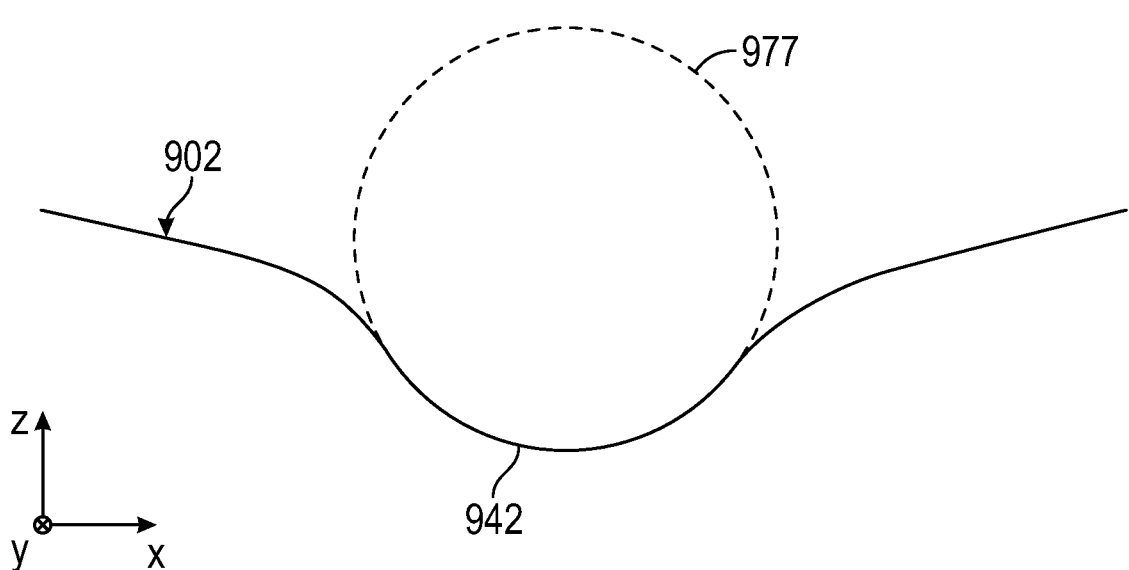
FIGS. 9-10 are schematic cross-sectional views of unstretched bent optical films.
Figure 10:
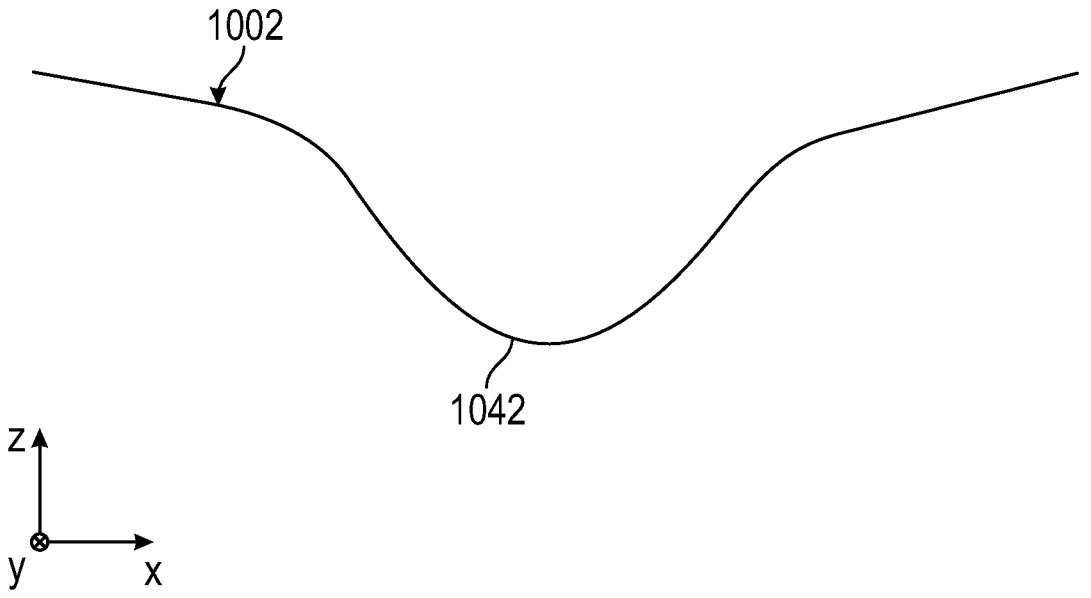

In some embodiments, at least a portion of the first shape is cylindrical or parabolic. FIG. 9 is a schematic cross-sectional view of unstretched bent optical film 902 having a central region 942 having a first shape where the first shape is cylindrical. A cylindrical shape is the shape of a portion of a cylinder. The unstretched bent optical film 902 is bent about the y-direction but not about the x-direction. In the illustrated embodiment, the first shape is a shape of a portion of an outer surface of the cylinder 977. FIG. 10 is a schematic cross-sectional view of unstretched bent optical film 1002 having a central region 1042 having a first shape where the first shape is parabolic. The unstretched bent optical film 1002 is bent about the y-direction but not about the x-direction. In some embodiments, the first shape includes more than one cylindrical or parabolic portions. For example, in some embodiments, the first shape includes at least two spaced apart substantially parallel cylindrical or parabolic portions.

FIG. 11 is a schematic top view of an unstretched bent optical film 1102 having a central region 1142 and a peripheral region 1137. The central region 1142 includes spaced apart first and second central regions 1142a and 1142b. The peripheral region 1137 includes a first peripheral region 1137a surrounding the first central region 1142a and a second peripheral region 1137b surrounding the second central region 1132b. In some embodiments, the first and second central regions 1142a and 1142b are each cylindrical portions of the central region 1142. In some embodiments, the first and second central regions 1142a and 1142b are each parabolic portions of the central region 1142. In some embodiments, the unstretched bent optical film 1102 is bent about the y-direction, but not about the x-direction.

EXAMPLES

Example 1

A reflective polarizer film was made as follows. Two multilayer optical packets were co-extruded with each packet containing 325 alternating layers of polyethylene naphthalate (PEN) and a low index isotropic layer, which was made with a blend of polycarbonate and copolyesters (PC:coPET) such that the index was about 1.57 and remained substantially isotropic upon uniaxial orientation. The PC:coPET molar ratio was approximately 42.5 mol % PC and 57.5 mol % coPET and the PC:coPET had a Tg of 105 degrees centigrade. This isotropic material was chosen such that after stretching its refractive indices in the two non-stretch directions remained substantially matched with those of the birefringent material in the non-stretching direction while in the stretching direction there was a substantial mismatch in refractive indices between birefringent and non-birefringent layers. The PEN and PC/coPET polymers were fed from separate extruders to a multilayer coextrusion feedblock, in which they were assembled into packets of 325 alternating optical layers, plus a thicker protective boundary layer of the PC/coPET, on the outside of the stacked optical packets, for a total of 652 layers. The thicker layers of one of the packets was adjacent the thinner layers of the other packet and the range of thickness of the layers of the two packets were about the same. The film was substantially uniaxially stretched in a parabolic tenter as described in U.S. Pat. No. 6,916,440 (Jackson et al.). The film was stretched at a temperature of about 150° C. to a draw ratio of about 6.

A sheet of the reflective polarizer was cut into several samples having a same size and shape with the samples taken from adjacent sections of the reflective polarize sheet. One of the samples was used to measure thickness and spectra to establish an initial thickness and band edge wavelength, and the others were formed into the desired shape. A protective olefin liner was applied to one side of the reflective polarizer sample to be formed and polyester liners with a weak tack was applied to the olefin liner and to the opposite side of the reflective polarizer film sample.

The pressurization process was implemented using an apparatus as illustrated in FIG. 12 in a forming machine from Hy-Tech Forming Systems (USA), Inc. (Phoenix, AZ). The sample of the film was placed on the forming machine on top of a lower platen (corresponding to lower platen 1252) that included a female form machined from porous aluminum (corresponding to mold insert 1255) and maintained at a temperature of 80° F. The side of the film with the olefin liner was facing away from the lower platen. The block axis of the reflective polarizer was along the long direction of the optical film (x-direction of FIG. 1A). An upper platen (corresponding to upper platen 1251) preheated to 350° F. was then closed down on the lower platen clamping the edges of the film in place. The film was allowed to slide relative to the upper and lower platens as the platens approached the film so that the film was bent but not stretched since the film was bent about one axis only. The film had the shape generally illustrated in FIGS. 1D and 12 at this point in the process. A pressure of 60 psi was then applied to the bottom side of the film (through the porous aluminum) to press the film against the flat heated platen above. This pressure was maintained for 6 seconds. The bottom side pressure was released and a 475 psi pressure was applied to the upper side of the film to inflate the film into the female form below. The pressure was maintained for 6 seconds and then the formed part (with formed liners) was removed from the machine. The result was a curved optical film having the shape generally illustrated in FIGS. 1A-1C.

Referring to the coordinate systems of FIGS. 1B-1C, along the x-direction, the resulting shaped film had a projected length PL1 (see FIG. 1B) of 7.63 inches and an actual length AL1 of 9.24 inches, and along the y-direction, the resulting shaped film had a projected length PL2 (see FIG. 1C) of 4.63 inches and an actual length AL2 of 4.68 inches. A peripheral portion of the optical film can be removed leaving an optical film having the geometry schematically illustrated in FIGS. 2A-2B. This resulting optical film has a projected length PL1 (see FIG. 2A) of 7.47 inches and an actual length AL1 of 8.96 inches, and along the y-direction, has a projected length PL2 (see FIG. 2B) of 2.86 inches and an actual length AL2 of 2.90 inches.

The liners were removed and the thickness and band edge wavelength were measured for the formed film samples and for the flat film samples. The thickness was measured using a capacitance gauge. The band edge wavelength was determined as follows. The block state transmission was measured at normal incidence as a function of wavelength using a Lambda 950 spectrophotometer (available from PerkinElmer, Waltham, MA). The right (long) wavelength band edge was determined as the wavelength where the block state transmission reached 10%.

Referring to the coordinate system shown in FIG. 1A with x'=0, y'=0 at the center of the film, the thickness and band edge wavelength was determined at y'=0 (vertical location of 0 inches) for various x' values (horizontal location). Separate measurements of the thickness were carried out for several fixed x' values for various y' values.

Table 1 reports results for thickness and band edge wavelength for x'-values (horizontal location) ranging from −4 inches to +4 inches at y'=0 inches.

TABLE 1

| | | | | Unformed Film Right | Formed Film Right | |
|---|---|---|---|---|---|---|
| Horizontal Location (in) | Flat Film Thickness (μm) | Formed Film Thickness (μm) | Percent Thickness Change | Band Edge (nm) | Band Edge (nm) | Percent Band Edge Change |
| −4.0 | 62.5 | 58.5 | −6.4% | 831.0 | 776.0 | −6.6% |
| −3.5 | 62.5 | 56.0 | −10.4% | 833.0 | 741.0 | −11.0% |
| −3.0 | 62.5 | 57.5 | −8.0% | 834.0 | 759.0 | −9.0% |
| −2.0 | 62.5 | 61.5 | −1.6% | 833.0 | 811.0 | −2.6% |
| −1.0 | 62.0 | 62.0 | 0.0% | 832.0 | 821.0 | −1.3% |
| 0.0 | 62.5 | 62.5 | 0.0% | 835.0 | 835.0 | 0.0% |
| 1.0 | 62.5 | 62.5 | 0.0% | 836.0 | 824 | −1.4% |
| 2.0 | 63.0 | 61.0 | −3.2% | 839.0 | 816 | −2.7% |
| 3.0 | 63.0 | 57.5 | −8.7% | 842.0 | 763 | −9.4% |
| 3.5 | 62.5 | 57.0 | −8.8% | 832.0 | 751 | −9.7% |
| 4.0 | 63.0 | 59.0 | −6.3% | 839.0 | 791 | −5.7% |

Table 2-5 report results for the measured x'-values (horizontal location) being 0 inches, −2 inches, −3 inches, and −3.5 inches, respectively, and for y'-values (vertical location) ranging from 0 inches to 1.25 inches.

TABLE 2

Horizontal Location of 0 inches

| Vertical Location (in) | Flat Film Thickness (μm) | Formed Film Thickness (μm) | Percent Thickness Change |
|---|---|---|---|
| 1.25 | 62.5 | 62.0 | −0.8% |
| 1.00 | 62.5 | 62.5 | 0.0% |
| 0.75 | 62.5 | 63.0 | 0.8% |
| 0.50 | 62.5 | 63.5 | 1.6% |
| 0.00 | 62.5 | 63.5 | 1.6% |

TABLE 3

Horizontal Location of −2.0 inches

| Vertical Location (in) | Flat Film Thickness (μm) | Formed Film Thickness (μm) | Percent Thickness Change |
|---|---|---|---|
| 1.25 | 62.5 | 63.0 | 0.8% |
| 1.00 | 62.5 | 62.0 | −0.8% |
| 0.75 | 62.5 | 61.5 | −1.6% |
| 0.50 | 62.5 | 61.5 | −1.6% |
| 0.00 | 62.5 | 61.0 | −2.4% |

TABLE 3

Horizontal Location of −3.0 inches

| Vertical Location (in) | Flat Film Thickness (μm) | Formed Film Thickness (μm) | Percent Thickness Change |
|---|---|---|---|
| 1.25 | 62.5 | 62.0 | −0.8% |
| 1.00 | 62.5 | 60.0 | −4.0% |
| 0.75 | 62.5 | 59.0 | −5.6% |
| 0.50 | 62.5 | 57.5 | −8.0% |
| 0.00 | 62.5 | 56.5 | −9.6% |

TABLE 4

Horizontal Location of −3.5 inches

| Vertical Location (in) | Flat Film Thickness (μm) | Formed Film Thickness (μm) | Percent Thickness Change |
|---|---|---|---|
| 1.25 | 62.5 | 62.0 | −0.8% |
| 1.00 | 62.5 | 60.5 | −3.2% |
| 0.75 | 62.5 | 59.0 | −5.6% |
| 0.50 | 62.5 | 57.0 | −8.8% |
| 0.00 | 62.5 | 56.0 | −10.4% |

Example 2

An infrared-reflective multilayer optical film, which had greater than 99% reflection for normally incident light having wavelengths from 800-1300 nm, was made from two packets of 275 alternating microlayers layers of poly(ethylene naphthalate) (PEN) and poly(methyl methacrylate) (PMMA) having a layer thickness gradient, with each packet having a boundary layer of PEN. The outer layer of the combined two packet construction had skin layers of XYLEX RESIN polycarbonate polyester/blend from Sabic IP, Dusseldorf, Germany. The film was prepared generally according to the method described in U.S. Pat. No. 7,271, 951 B2 (Weber et al.).

The film was stretched and shaped into a curved shape as described in Example 1. The thickness and band edge wavelength was determined as in Example 1 except that the left (short) wavelength band edge of the near infrared reflection band was determined as the wavelength where the transmission reached 10%.

Table 5 reports results using the coordinate system shown in FIG. 1A with x'=0, y'=0 at the center of the film, the measured x'-values (horizontal location) ranging from −4 inches to +4 inches at y'=0 inches.

TABLE 5

| | | | | Unformed | Formed | |
| Horizontal Location (in) | Flat Film Thickness (μm) | Formed Film Thickness (μm) | Percent Thickness Change | Film Left Band Edge (nm) | Film Left Band Edge (nm) | Percent Band Edge Change |
|---|---|---|---|---|---|---|
| | | | Vertical Location of 0 inches | | | |
| −4.0 | 105.3 | 96.0 | −8.8% | 770 | 698 | −9.4% |
| −3.5 | 105.0 | 94.0 | −10.5% | 771 | 676 | −12.3% |
| −3.0 | 105.0 | 95.0 | −9.5% | 771 | 697 | −9.6% |
| −2.0 | 104.8 | 101.5 | −3.1% | 773 | 737 | −4.7% |
| −1.0 | 104.5 | 102.0 | −2.4% | 773 | 746 | −3.5% |
| 0.0 | 104.8 | 104.5 | −0.2% | 776 | 761 | −1.9% |
| 1.0 | 105.0 | 102.5 | −2.4% | 777 | 752 | −3.2% |
| 2.0 | 105.0 | 100.5 | −4.3% | 782 | 740 | −5.4% |
| 3.0 | 105.0 | 95.5 | −9.0% | 783 | 704 | −10.1% |
| 3.5 | 105.0 | 93.0 | −11.4% | 782 | 691 | −11.6% |
| 4.0 | 105.3 | 95.5 | −9.3% | 784 | 723 | −7.8% |

Table 6-9 report results for the measured x'-values (horizontal location) being 0 inches, −2 inches, −3 inches, and −3.5 inches, respectively, and for y'-values (vertical location) ranging from 0 inches to 1.25 inches.

TABLE 6

Horizontal Location of 0 inches

| Vertical Location (in) | Flat Film Thickness (μm) | Formed Film Thickness (μm) | Percent Thickness Change |
|---|---|---|---|
| 1.25 | 104.8 | 102.5 | −2.2% |
| 1.00 | 104.8 | 102.5 | −2.2% |
| 0.75 | 104.8 | 103.0 | −1.7% |
| 0.50 | 104.8 | 104.5 | −0.3% |
| 0.00 | 104.8 | 104.5 | −0.3% |

TABLE 7

Horizontal Location of −2.0 inches

| Vertical Location (in) | Flat Film Thickness (μm) | Formed Film Thickness (μm) | Percent Thickness Change |
|---|---|---|---|
| 1.25 | 104.8 | 104.0 | −0.8% |
| 1.00 | 104.8 | 103.5 | −1.2% |
| 0.75 | 104.8 | 102.0 | −2.7% |
| 0.50 | 104.8 | 101.0 | −3.6% |
| 0.00 | 104.8 | 101.5 | −3.1% |

TABLE 8

Horizontal Location of −3.0 inches

| Vertical Location (in) | Flat Film Thickness (μm) | Formed Film Thickness (μm) | Percent Thickness Change |
|---|---|---|---|
| 1.25 | 105.0 | 103.5 | −1.4% |
| 1.00 | 105.0 | 100.5 | −4.3% |
| 0.75 | 105.0 | 98.5 | −6.2% |
| 0.50 | 105.0 | 96.0 | −8.6% |
| 0.00 | 105.0 | 95.5 | −9.0% |

TABLE 9

Horizontal Location of −3.5 inches

| Vertical Location (in) | Flat Film Thickness (μm) | Formed Film Thickness (μm) | Percent Thickness Change |
|---|---|---|---|
| 1.25 | 105.0 | 103.5 | −1.4% |
| 1.00 | 105.0 | 100.5 | −4.3% |
| 0.75 | 105.0 | 98.5 | −6.2% |
| 0.50 | 105.0 | 93.5 | −11.0% |
| 0.00 | 105.0 | 92.0 | −12.4% |

Example 3

An absorptive polarizer including dichroic dyes was made as follows. The center layer of the co-extruded 3 layer film was CoPEN 90/10 (a copolymer comprising 90% polyethylene naphthalate (PEN) units and 10% polyethylene terephthalate (PET) units) fed into a twin screw extruder with dichroic dyes (Mitsui Fine Chemical, Japan) at the following weight percentages; PD-104 at 0.190%, PD-325H at 0.364%, PD-335H 0.085%, PD-318H at 0.405%. The total extrusion rate of the center layer was 22.7 Kg/hr. The outer film layers were coextruded with the center layer. The outer layers were made from a blend of polycarbonate and copolyesters (PC:coPET). The PC:coPET molar ratio was approximately 42.5 mol % PC and 57.5 mol % coPET. The total extrusion rate of the 2 outer layers was 45.4 Kg/hr. The co-extruded 3 layer film was fed through a 0.34 meter die to form a cast sheet at a speed of 6.7 feet/minute. The cast sheet was stretched in a tenter at a ratio of about 6 at a temperature of 146° C.

The film was stretched and shaped into a curved shape as described in Example 1 with the block axis along the long direction of the optical film (x-direction of FIG. 1A) and the thickness was determined as in Example 1.

Table 10 reports results using the coordinate system shown in FIG. 1A with x'=0, y'=0 at the center of the film, the measured x'-values (Horizontal location) ranging from −4 inches to +4 inches at y'=0 inches.

TABLE 10

Vertical Location of 0 inches

| Horizontal Location (in) | Flat Film Thickness (μm) | Formed Film Thickness (μm) | Flat Film Pass State Trans. (%) | Flat Film Block State Trans. (%) | Formed Film Pass State Trans. (%) | Formed Film Block State Trans. (%) |
|---|---|---|---|---|---|---|
| −4.0 | 71.5 | 63.5 | 77.40 | 12.86 | 76.13 | 19.01 |
| −3.5 | 71.5 | 61.0 | 77.56 | 12.92 | 76.27 | 19.63 |
| −3.0 | 70.5 | 63.5 | 77.36 | 12.77 | 75.46 | 18.49 |
| −2.0 | 72.0 | 68.0 | 77.33 | 12.67 | 74.39 | 16.10 |
| −1.0 | 71.0 | 68.5 | 77.42 | 12.87 | 74.30 | 14.95 |
| 0.0 | 71.5 | 68.5 | | | | |
| 1.0 | 70.0 | 68.0 | 77.63 | 13.08 | 74.02 | 14.71 |
| 2.0 | 70.5 | 66.5 | 77.63 | 13.20 | 73.95 | 15.13 |
| 3.0 | 71.5 | 60.5 | 77.75 | 13.35 | 74.95 | 16.52 |
| 3.5 | 70.5 | 60.0 | 77.75 | 13.56 | 74.94 | 16.94 |
| 4.0 | 69.5 | 62.0 | 77.90 | 13.61 | 73.81 | 15.41 |

Example 4

A 0.040 mm thick polyvinyl alcohol (PVA) absorptive polarizer film available from YS America (Torrance, CA) was used as the optical film in this Example. Other PVA absorptive polarizers would be expected to give similar results. The film was stretched and shaped into a curved shape as described in Example 1 except that the upper platen was pre-heated to a temperature of 280° F. in the pressurization process. The pass axis was along the long direction of the optical film (x-direction of FIG. 1A). The thickness was determined as in Example 1.

Table 11 reports results using the coordinate system shown in FIG. 1A with x'=0, y'=0 at the center of the film, the measured x'-values (horizontal location) ranging from −4 inches to +4 inches at y'=0 inches.

TABLE 11

Vertical Location of 0 inches

| Horizontal Location (in) | Flat Film Thickness (μm) | Formed Film Thickness (μm) | Flat Film Pass State Trans. (%) | Flat Film Block State Trans. (%) | Formed Film Pass State Trans. (%) | Formed Film Block State Trans. (%) |
|---|---|---|---|---|---|---|
| −4.0 | 97.5 | 90.0 | 84.67 | 0.21 | | |
| −3.5 | 97.0 | 90.0 | 84.70 | 0.22 | | |
| −3.0 | 96.5 | 90.0 | 84.73 | 0.21 | 85.19 | 0.30 |
| −2.0 | 95.5 | 95.0 | 84.71 | 0.21 | 84.82 | 0.29 |
| −1.0 | 96.0 | 95.5 | 84.67 | 0.21 | 84.98 | 0.28 |
| 0.0 | 97.0 | 97.0 | | | | |
| 1.0 | 96.5 | 96.0 | 84.77 | 0.21 | 85.04 | 0.27 |
| 2.0 | 96.5 | 93.5 | 84.69 | 0.21 | 85.03 | 0.27 |
| 3.0 | 96.5 | 88.0 | 84.53 | 0.20 | 85.17 | 0.31 |
| 3.5 | 96.0 | 88.0 | 84.66 | 0.21 | 85.88 | 0.41 |
| 4.0 | 95.5 | 84.5 | 84.60 | 0.21 | 85.63 | 0.25 |

If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A curved optical film generally lying in a base plane and having an average thickness of less than about 500 microns, and an average optical absorption of less than about 70% for substantially unpolarized substantially normally incident light in a predetermined wavelength range extending at least from 450 nm to 600 nm, a first cross-section of the optical film in a first plane perpendicular to the base plane having an actual first length AL1, a projected first length PL1 on the base plane, and a first stretch ratio S1 defined as (AL1−PL1)/PL1, S1≥0.1, a second cross-section of the optical film in a second plane perpendicular to the first and base planes having an actual second length AL2, a projected second length PL2 on the base plane, and a second stretch ratio S2 defined as (AL2−PL2)/PL2, 0.01≤S2<0.8S1, the optical film having a maximum thickness variation of less than about 20% along each of the first and second cross-sections.

2. The optical film of claim 1, wherein the maximum thickness variation is in a range from about 0.05S1 to about 0.8S1 along each of the first and second cross-sections.

3. The optical film of claim 1, wherein the first cross-section of the optical film has a maximum slope M relative to the base plane and has a maximum deviation D1 from a straight line connecting opposing ends of the first cross-section, 0.2*PL1*M≥D1≥0.05*PL1.

4. The optical film of claim 1, wherein the first cross-section of the optical film has a maximum slope M relative to the base plane of at least 1.

5. The optical film of claim 1, wherein PL1≥1.5PL2.

6. The optical film of claim 1, wherein the optical film has opposite major surfaces having a substantially same shape, and wherein in the first cross-section of the optical film, the shape comprises one or more inflection points.

7. The optical film of claim 1, wherein the optical film has opposite major surfaces having a substantially same shape, the shape comprising at least one saddle point.

8. The optical film of claim 1, wherein for substantially normally incident light, each location on the optical film has a corresponding reflection band having a band edge wavelength, the band edge wavelength varying less than 15% along each of the first and second cross-sections.

9. A curved optical film generally lying in a base plane and having an average thickness of less than about 500 microns, and an average optical absorption of less than about 70% for substantially unpolarized substantially normally incident light in a predetermined wavelength range extending at least from 450 nm to 600 nm, a first cross-section of the optical film in a first plane perpendicular to the base plane having an actual first length AL1, a projected first length PL1 on the base plane, and a first stretch ratio S1 defined as (AL1−PL1)/PL1, a second cross-section of the optical film in a second plane perpendicular to the first and base planes having an actual second length AL2, a projected second length PL2 on the base plane, and a second stretch ratio S2 defined as (AL2−PL2)/PL2, 0.01<S2<0.7S1, the optical film having a maximum thickness variation in a range from about 0.05S1 to about 0.8S1 along each of the first and second cross-sections.

10. The optical film of claim 9, wherein the maximum thickness variation is less than about 20% along each of the first and second cross-sections.

11. The optical film of claim 9, wherein the second cross-section of the optical film has a maximum deviation D2 from a straight line connecting opposing ends of the second cross-section, 0.1D1<D2<0.7D1.

12. The optical film of claim 9, wherein the optical film has opposite major surfaces having a substantially same shape, and wherein in the first cross-section of the optical film, the shape comprises one or more inflection points.

13. The optical film of claim 9, wherein the optical film has opposite major surfaces having a substantially same shape, the shape comprising at least one saddle point.

14. The optical film of claim 9, wherein for substantially normally incident light, each location on the optical film has a corresponding reflection band having a band edge wavelength, the band edge wavelength varying less than 15% along each of the first and second cross-sections.

15. A stretched and shaped optical film stretched and shaped along at least mutually orthogonal directions and having an average optical absorption of less than about 70% for substantially unpolarized substantially normally incident light in a predetermined wavelength range extending at least from 450 nm to 600 nm, such that when the optical film is placed on a flat surface, a first cross-section of the optical film in a first plane perpendicular to the flat surface has a maximum deviation D1 from a straight line connecting opposing ends of the first cross-section, the first plane chosen to maximize D1, a second cross-section of the optical film in a second plane perpendicular to the first plane and the flat surface has a maximum deviation D2 from a straight line connecting opposing ends of the second cross-section, the second plane chosen to maximize D2, 0.1D1<D2<0.7D1, the optical film having a maximum thickness variation of less than about 15% along each of the first and second cross-sections.

16. The optical film of claim 15, wherein in the first cross-section, the optical film has an actual first length AL1, a projected first length PL1 on the flat surface, and a first stretch ratio S1 defined as (AL1−PL1)/PL1, S1≥0.1, and in the second cross-section, the optical film has an actual second length AL2, a projected second length PL2 on the flat surface, and a second stretch ratio S2 defined as (AL2−PL2)/PL2, 0.01≤S2<0.7S1.

17. The optical film of claim 16, wherein the first cross-section of the optical film has a maximum slope M relative to the flat surface, 0.2*PL1*M≥D1≥0.05*PL1.

18. The optical film of claim 15, wherein the optical film has opposite major surfaces having a substantially same shape, and wherein in the first cross-section of the optical film, the shape comprises one or more inflection points.

19. The optical film of claim 15, wherein the optical film has opposite major surfaces having a substantially same shape, the shape comprising at least one saddle point.

20. The optical film of claim 15, wherein for substantially normally incident light, each location on the optical film has a corresponding reflection band having a band edge wavelength, the band edge wavelength varying less than 15% along each of the first and second cross-sections.

* * * * *